United States Patent
Nakatani

(10) Patent No.: US 11,642,894 B2
(45) Date of Patent: May 9, 2023

(54) MANUFACTURING METHOD OF THERMAL PRINT HEAD

(71) Applicant: ROHM CO., LTD., Kyoto (JP)

(72) Inventor: Goro Nakatani, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/470,953

(22) Filed: Sep. 9, 2021

(65) Prior Publication Data

US 2022/0088941 A1 Mar. 24, 2022

(30) Foreign Application Priority Data

Sep. 23, 2020 (JP) .................. 2020-158986

(51) Int. Cl.
*B41J 2/335* (2006.01)
*B41J 2/345* (2006.01)
*B23K 26/362* (2014.01)

(52) U.S. Cl.
CPC .......... *B41J 2/3359* (2013.01); *B23K 26/362* (2013.01); *B41J 2/335* (2013.01); *B41J 2/3351* (2013.01); *B41J 2/3352* (2013.01); *B41J 2/3353* (2013.01); *B41J 2/345* (2013.01)

(58) Field of Classification Search
CPC ........ B41J 2/3359; B41J 2/335; B41J 2/3351; B41J 2/3352; B41J 2/3353; B41J 2/345; B23K 26/362
See application file for complete search history.

(56) References Cited

U.S. PATENT DOCUMENTS

| 2002/0009860 A1* | 1/2002 | Fjelstad | H01L 21/56 257/E23.125 |
| 2003/0147200 A1* | 8/2003 | Harada | H01C 1/148 361/321.4 |
| 2012/0147118 A1* | 6/2012 | Daicho | B41J 2/3354 347/202 |

FOREIGN PATENT DOCUMENTS

| EP | 0459481 A2 * 12/1991 | ............. B41J 2/335 |
| JP | H06135034 A * 5/1994 | ............. B41J 2/335 |
| JP | 2011156665 A   8/2011 | |

* cited by examiner

*Primary Examiner* — Yaovi M Ameh
(74) *Attorney, Agent, or Firm* — Hamre, Schumann, Mueller & Larson, P.C.

(57) ABSTRACT

The present disclosure provides a method for manufacturing a thermal print head. The method includes: forming an electrode layer on a substrate; and forming a resistor layer including a plurality of heat generating portions connected to the electrode layer. The electrode layer includes a plurality of individual electrodes including a plurality of first striped portions extending in a secondary scan direction and spaced apart in a main scan direction, and a common electrode including a plurality of second striped portions extending in the secondary scan direction. The forming of the resistor layer includes: a coating process of applying a resistor paste in a stripe that overlaps the first striped portions and the second striped portions; a firing process of firing the resistor paste to form a resistor film; and a removal process of removing a removal region in the resistor paste or the resistor film.

17 Claims, 20 Drawing Sheets

MANUFACTURING METHOD OF THERMAL PRINT HEAD

BACKGROUND OF THE INVENTION

Field of the Invention

The disclosure relates to a method for manufacturing a thermal print head.

Description of the Prior Art

There are available conventional thermal print heads that perform printing by applying heat to thermal paper or thermal ink ribbons. Patent document 1 discloses an example of such conventional thermal print head. The thermal print head disclosed in patent document 1 has a substrate, a resistor layer and an electrode layer (a lead wire conductor). The electrode layer is for forming a current path selectively passing a current to the resistor layer. The electrode layer is a layer formed of a metal, and is formed over the substrate. The electrode layer includes a plurality of comb portions (lead wire conductors on a ground side) and striped portions (lead wire conductors on a power supply side). The plurality of comb portions and the plurality of striped portions are in a counter electrode relation in terms of electricity. The plurality of comb portions and the plurality of strip portions individually extend along the secondary scan line. The plurality of comb portions and the plurality of striped portions are alternately arranged in the man scan direction. The resistor layer is formed in a stripe that crosses the comb portions and the striped portions and extends along the main scan direction. In the resistor layer, a part sandwiched by each comb portion and each striped portion becomes the heat generating portion.

PRIOR ART DOCUMENT

Patent Publication

[Patent document 1] Japan Patent Publication No. 2011-156665

SUMMARY

Problems to be Solved by the Invention

To electrically conduct one striped portion, a current in the heat generating portion flows to two adjacent comb portions on both sides in the main scan direction of the striped portion. Thus, the heat generating portion between the two adjacent comb portions interposed by one striped portion corresponds to one point of printing. In order to further reduce the size of one point, the space between the adjacent comb portions and the striped portion needs to be forcibly reduced in the man scan direction. However, the space is restrained by the precision of processes such as etching for patterning an electrode layer. As a result, high definition is made difficult to achieve.

The disclosure is conceived of on the basis of the situation above, in the goal of providing a method for manufacturing a thermal print head achieving high-definition printing.

Technical Means for Solving the Problem

A method for manufacturing a thermal print head provided by the disclosure includes the steps of: forming an electrode layer on a substrate; and forming a resistor layer including a plurality of heat generating portions connected to the electrode layer. The electrode layer includes a plurality of individual electrodes including a plurality of first striped portions extending in a secondary scan direction and spaced apart in a main scan direction, and a common electrode including a plurality of second striped portions extending in the secondary scan direction and arranged opposite to the plurality of first striped portions in the secondary scan direction. The forming of the resistor layer includes: a coating process of applying a resistor paste in a stripe that overlaps the plurality of first striped portions and the plurality of second striped portions and extends in the main scan direction; a firing process of firing the resistor paste to form a resistor film; and a removal process of removing a removal region in the resistor paste or the resistor film. The removal region includes: a first region located between adjacent two of the plurality of first striped portions in the main scan direction, a second region located between adjacent two of the plurality of second striped portions in the main scan direction, and a third region located between the first region and the second region in the secondary scan direction.

Effects of the Disclosure

High-definition printing of a thermal print head is achieved according to the disclosure.

Other features and advantages of the disclosure will become more readily apparent with the detailed description given with the accompanying drawings below.

DETAILED DESCRIPTION OF THE EMBODIMENTS

Details of the preferred embodiments of the disclosure are specifically given with the accompanying drawings below. The drawings are depicted illustratively. Accordingly, the drawings sometimes include omitted parts and emphasized parts.

The terms "first", "second" and "third" in the disclosure are used as denotations, and do not necessarily impose a sequence of their targets.

First Embodiment

Figure 1:
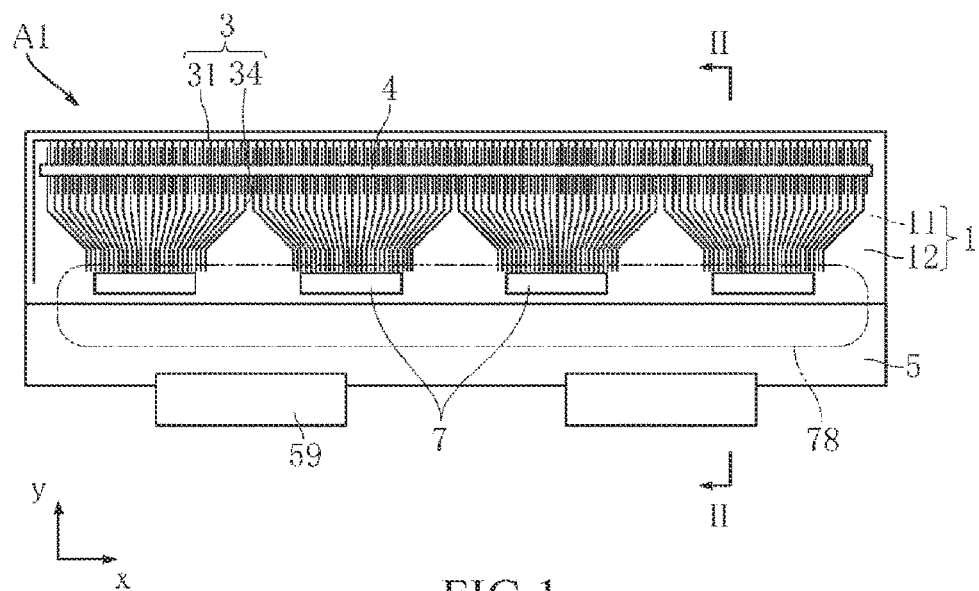
FIG. 1 is a top view of the thermal print head of the disclosure.
Figure 2:
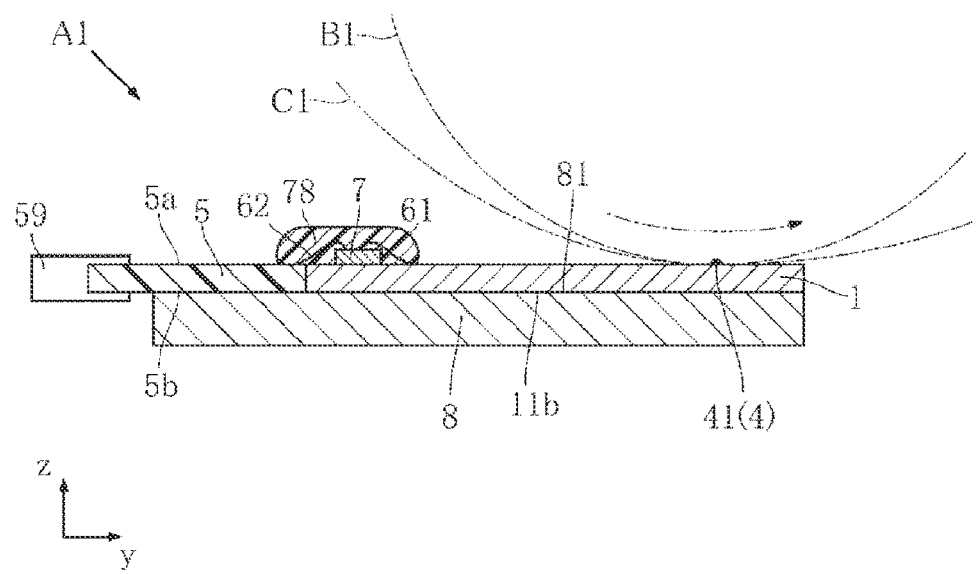
FIG. 2 is a section diagram along the line II-II in FIG. 1.
Figure 3:
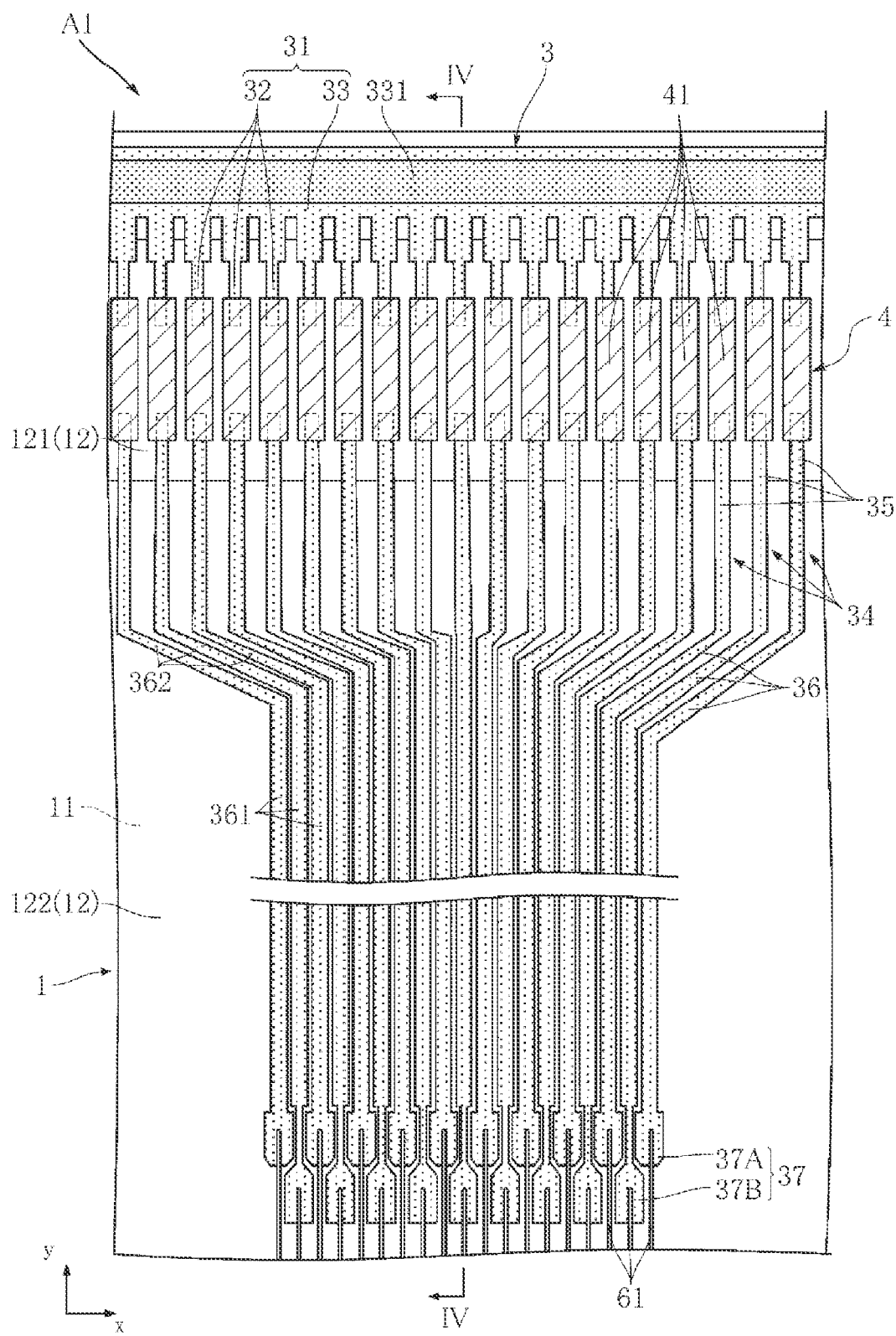
FIG. 3 is an enlarged partial diagram of a main part in the top view of FIG. 1.
Figure 4:
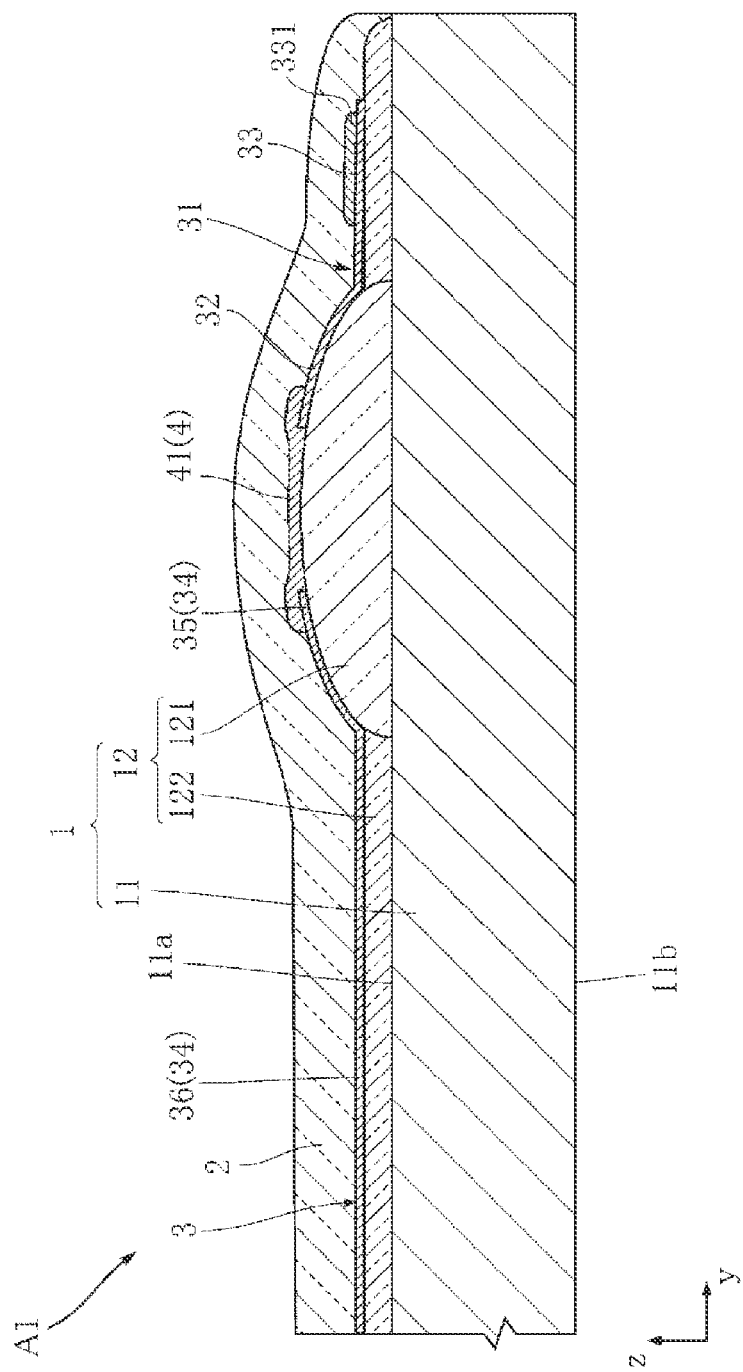
FIG. 4 is an enlarged section diagram of the main part along the line IV-IV in FIG. 3.
Figure 5:
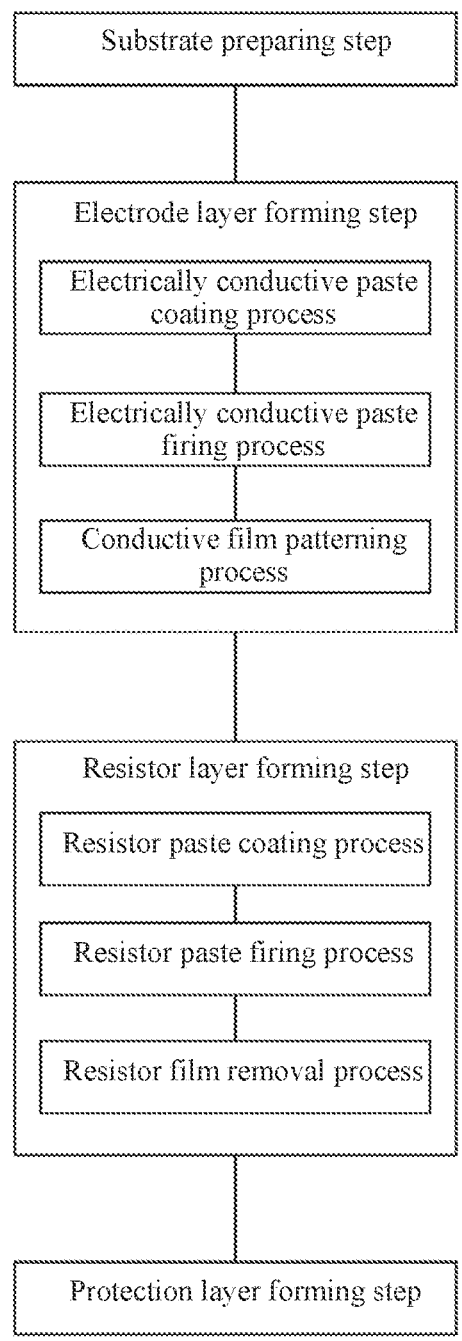
FIG. 5 is a flowchart of a method for manufacturing a thermal print head according to a first embodiment of the disclosure.
Figure 6:
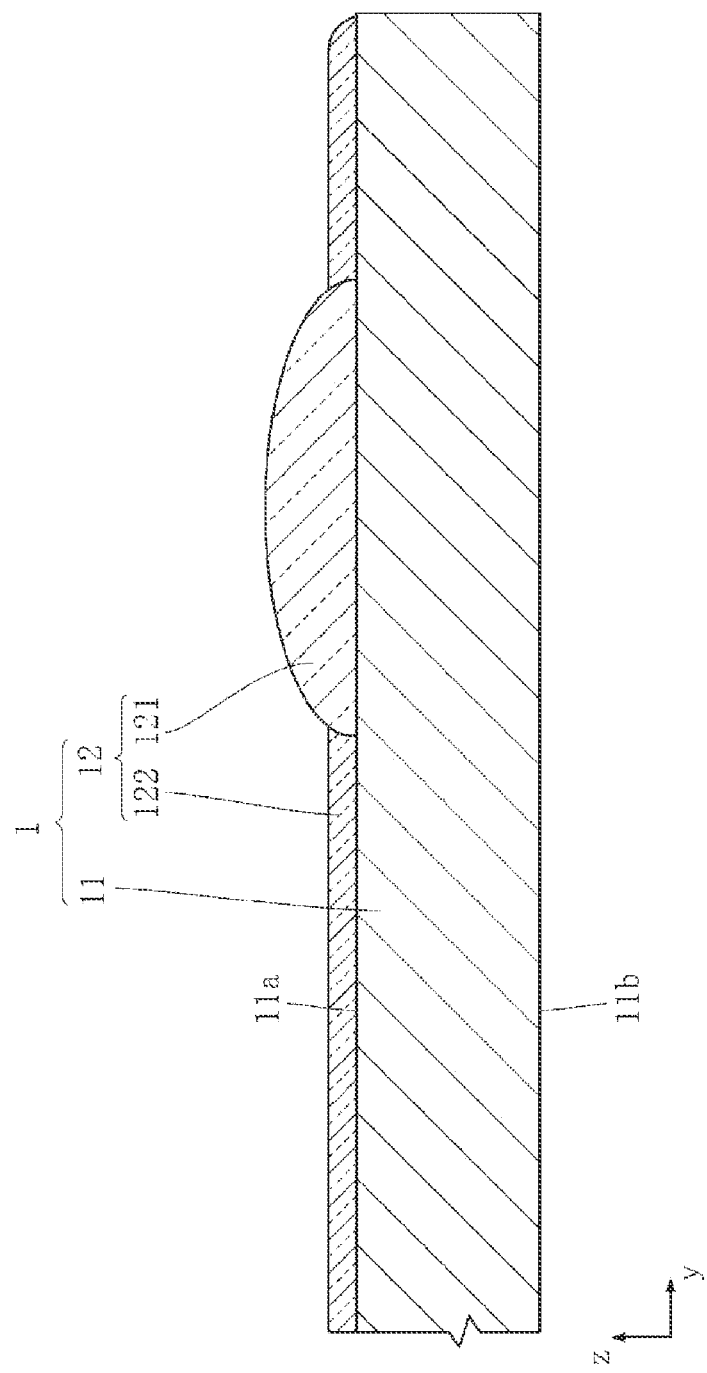
FIG. 6 is an enlarged section diagram of the main part in a step of the method for manufacturing a thermal print head according to the first embodiment of the disclosure.
Figure 7:
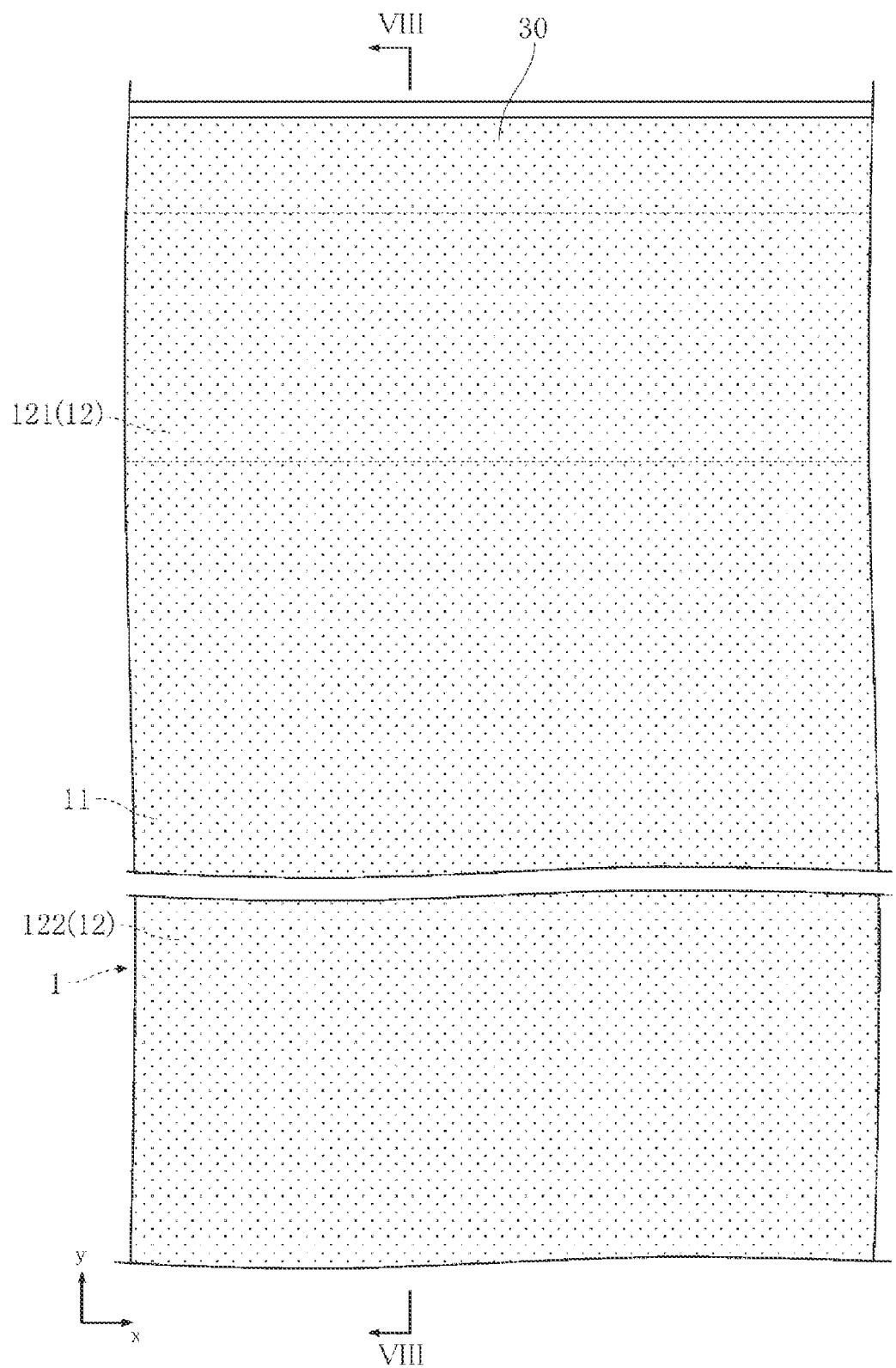
FIG. 7 is an enlarged top view of the main part in a step of the method for manufacturing a thermal print head according to the first embodiment of the disclosure.
Figure 8:
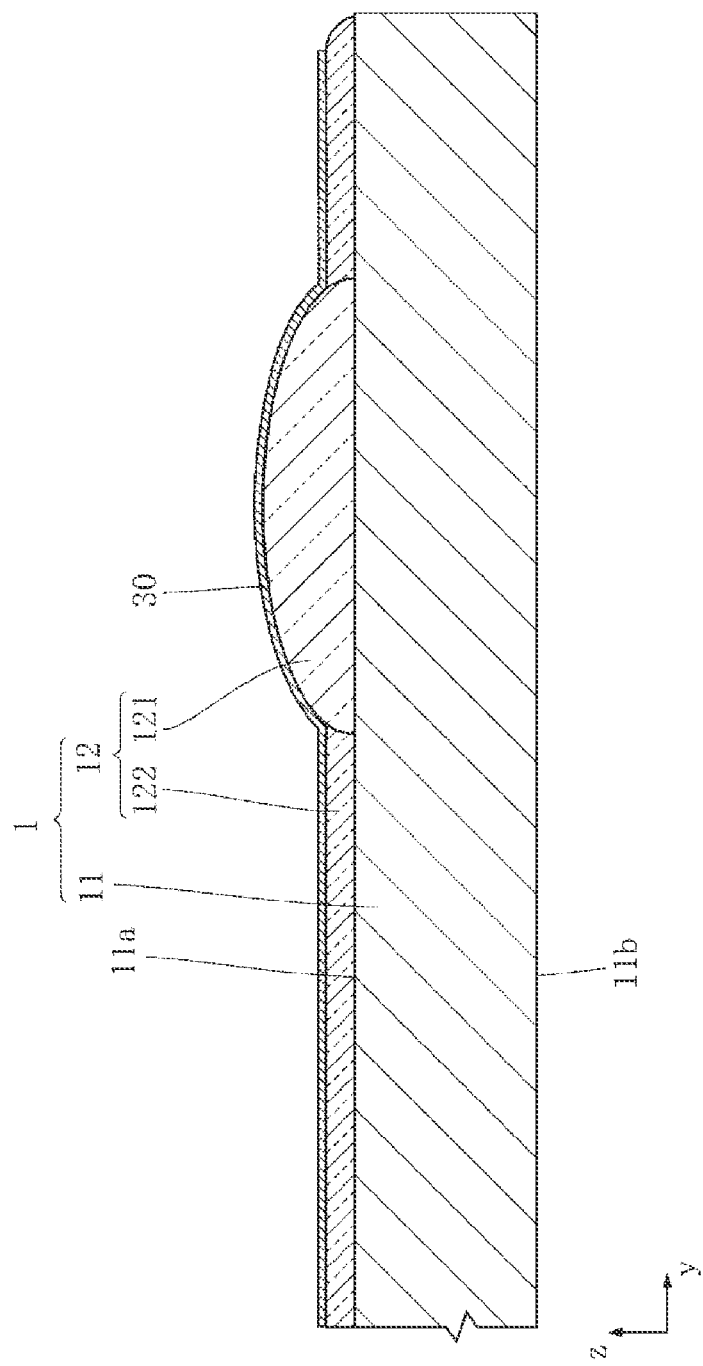
FIG. 8 is an enlarged section diagram of the main part along the line VIII-VIII in FIG. 7.
Figure 9:
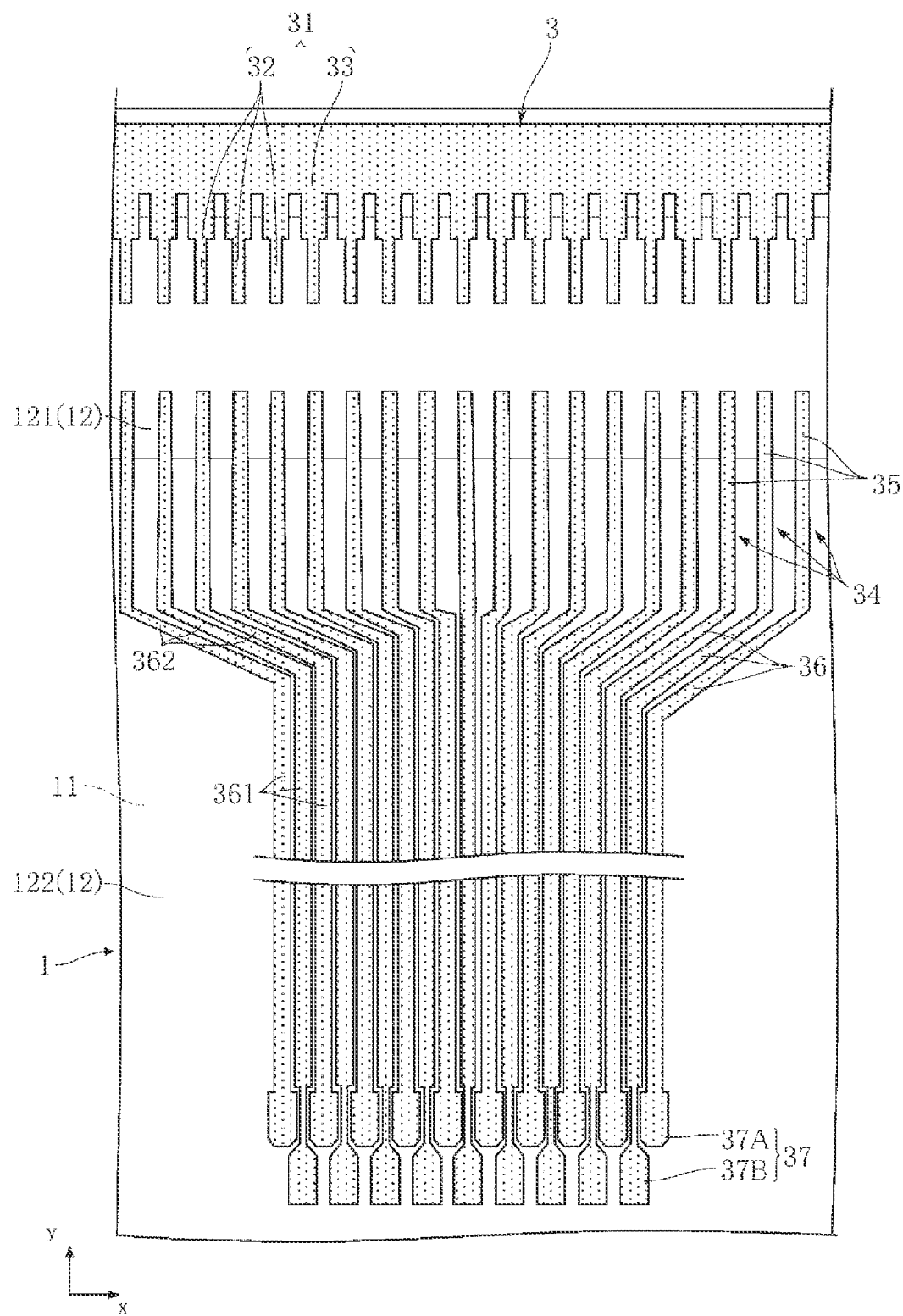
FIG. 9 is an enlarged top view of the main part in a step of the method for manufacturing a thermal print head according to the first embodiment of the disclosure.
Figure 10:
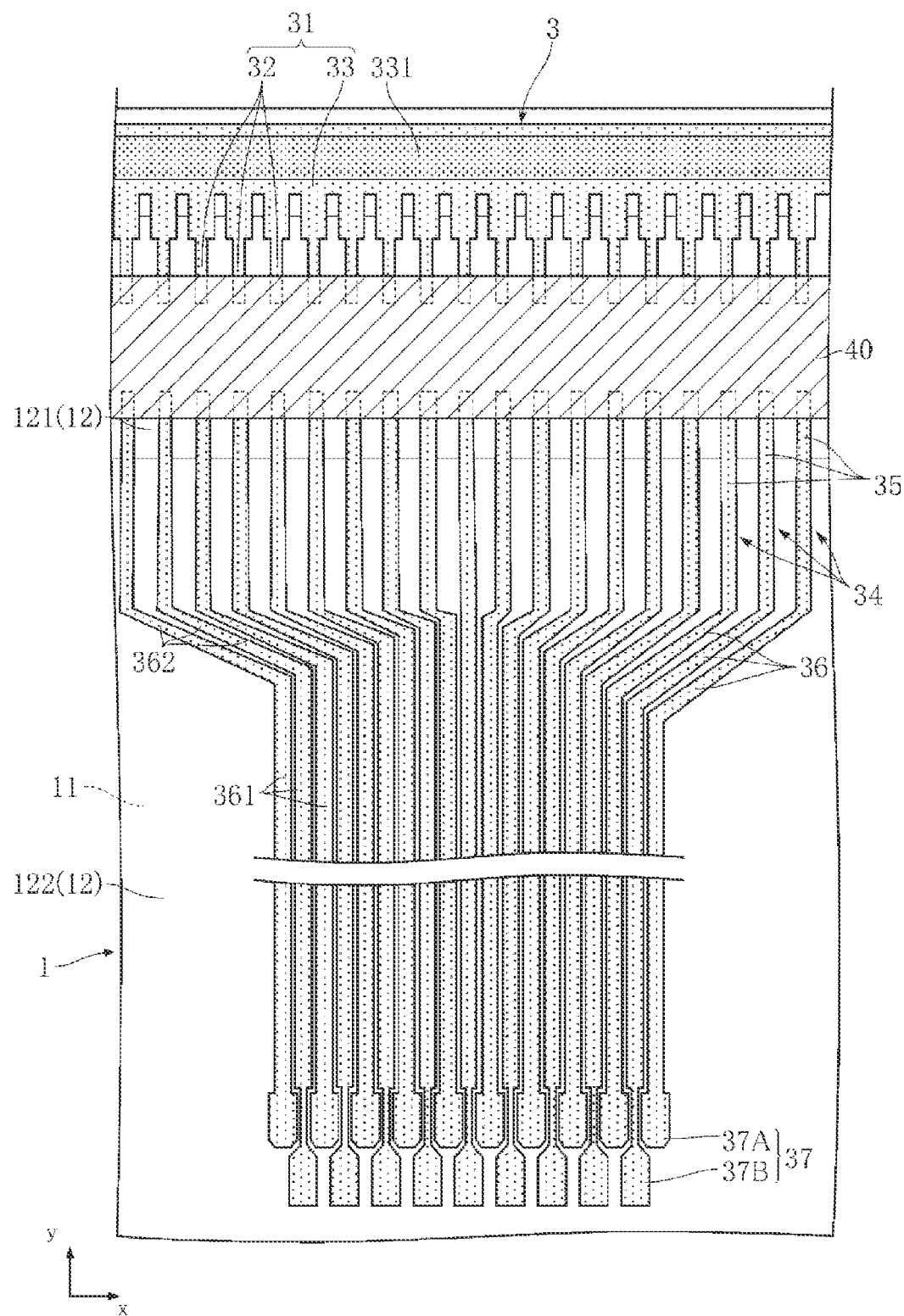
FIG. 10 is an enlarged top view of the main part in a step of the method for manufacturing a thermal print head according to the first embodiment of the disclosure.
Figure 11:
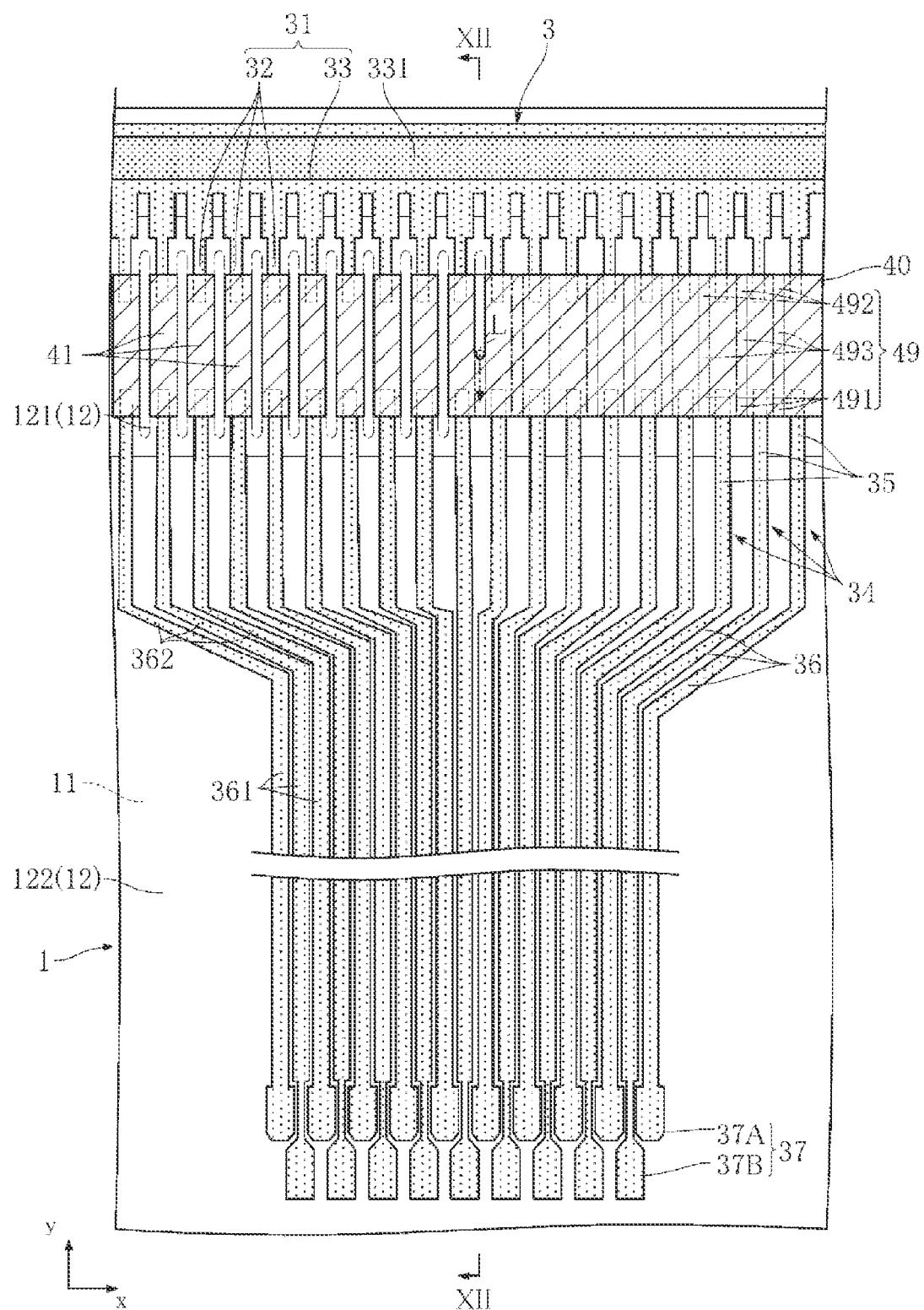
FIG. 11 is an enlarged top view of the main part in a step of the method for manufacturing a thermal print head according to the first embodiment of the disclosure.
Figure 12:
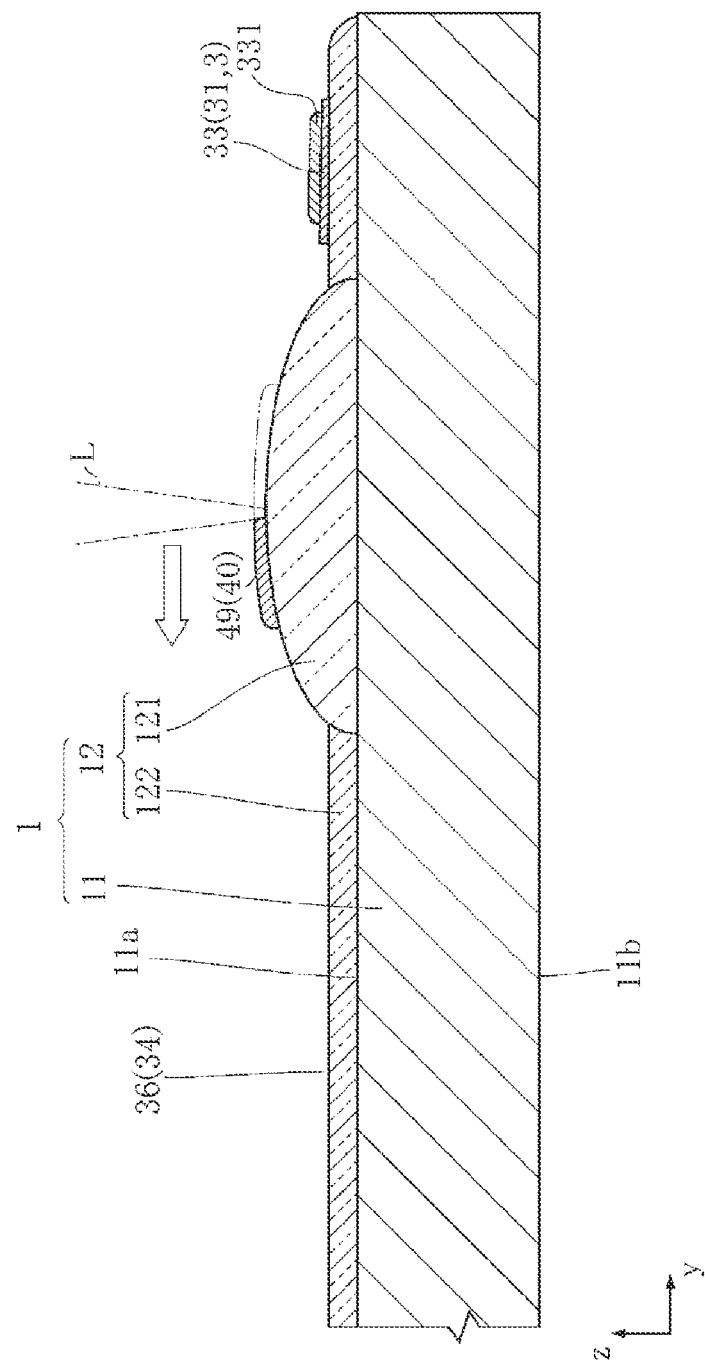
FIG. 12 is an enlarged section diagram of the main part along the line XII-XII in FIG. 11.
Figure 13:
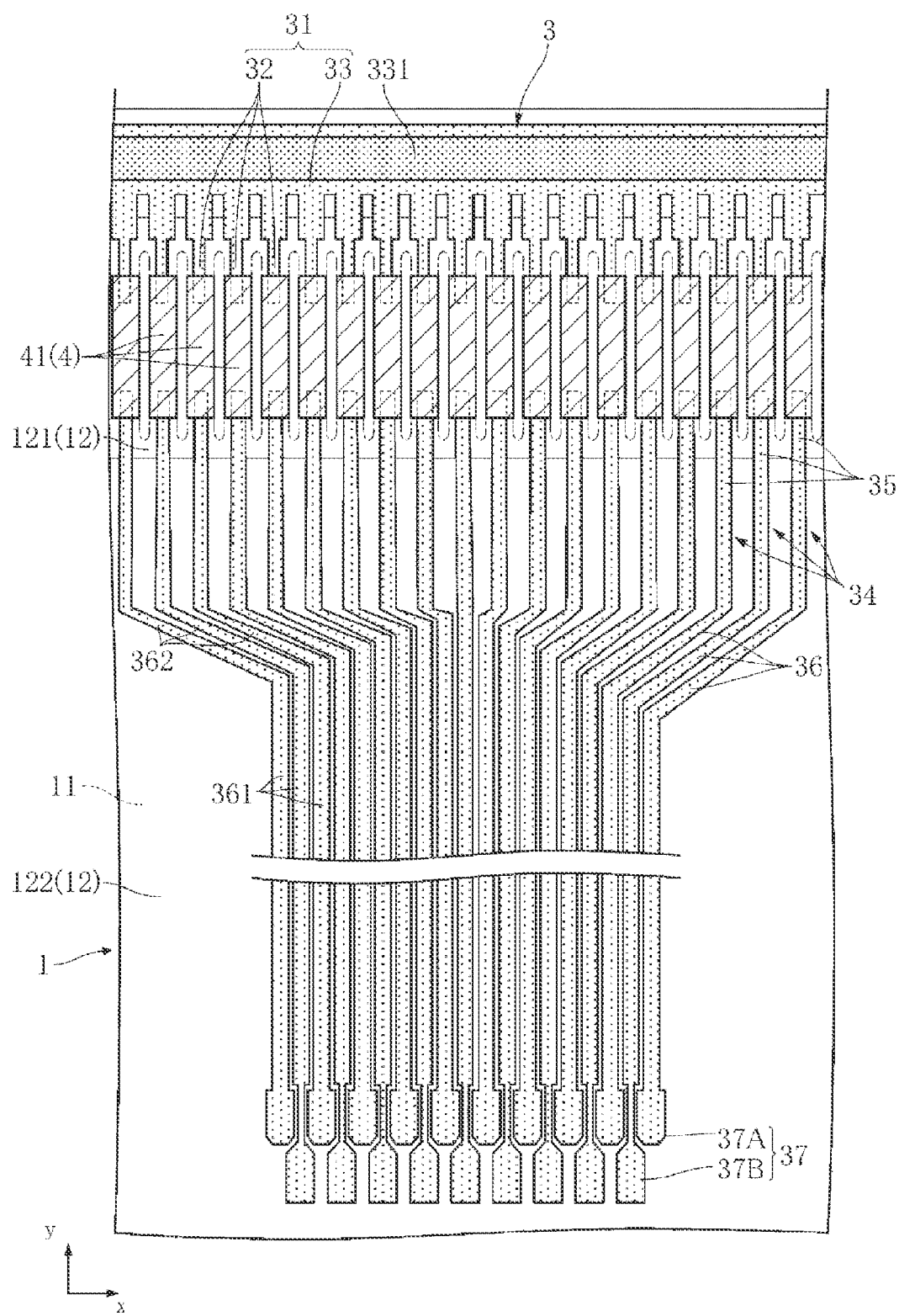
FIG. 13 is an enlarged top view of the main part in a step of the method for manufacturing a thermal print head according to the first embodiment of the disclosure.

FIG. 1 to FIG. 13 show a thermal print head and a method for manufacturing the thermal print head according to a first embodiment of the disclosure. FIG. 1 shows a top view of a thermal print head A1. FIG. 2 shows a section diagram along the line II-II in FIG. 1. FIG. 3 shows an enlarged partial diagram of a main part in the top view of FIG. 1. FIG. 4 shows an enlarged section diagram of the main part along the line IV-IV in FIG. 3. FIG. 5 shows a flowchart of a method for manufacturing the thermal print head A1. FIG. 6 shows an enlarged section diagram of the main part in a step of the method for manufacturing a thermal print head A1. FIG. 7 shows an enlarged section diagram of the main part in a step of the method for manufacturing a thermal print head A1. FIG. 8 shows an enlarged section diagram of the main part along the line VIII-VII in FIG. 7. FIG. 9 shows an enlarged section diagram of the main part in a step of the method for manufacturing a thermal print head A1. FIG. 10 shows an enlarged section diagram of the main part in a step of the method for manufacturing a thermal print head A1. FIG. 11 shows an enlarged section diagram of the main part in a step of the method for manufacturing a thermal print head A1. FIG. 12 shows an enlarged section diagram of the main part along the line XII-XII in FIG. 11. FIG. 13 shows an enlarged section diagram of the main part in a step of the method for manufacturing a thermal print head A1.

As shown in FIG. 1 to FIG. 4, the thermal print head A1 includes a substrate 1, a protection layer 2, an electrode layer 3, a resistor layer 4 including a plurality of heat generating portions 41 (referring to FIG. 4), a connection substrate 5, a plurality of lead wires 61 and 62, a plurality of driver integrated circuits (IC) 7, a protective resin 78 and a heating dissipation component 8. The thermal print head A1 is a component that is assembled in a thermal printer to perform printing on a printing medium C1 (referring to FIG. 2). A direction in which the plurality of heat generating portions 41 are arranged is referred to as a main scan direction, and a direction perpendicular to the main scan direction is referred to as a secondary scan direction.

The thermal printer includes the thermal printer A1 and a pressure feed roller B1. The pressure feed roller B1 faces straight to the thermal print head A1. The printing medium C1 is sandwiched between the thermal print head A1 and the pressure feed roller B1, and is transported by the pressure feed roller B1 along the secondary scan direction. The printing medium C1 may be, for example, thermal paper for making a barcode tag or a receipt. Alternatively, flat pressure feeder made of rubber may also be used in substitution to the pressure feed roller B1. The pressure feeder includes a bow-shaped part in a section view of a cylindrical rubber having a larger radius of curvature. In the disclosure, the term "pressure feeder" includes both the pressure feed roller B1 and the flat pressure feeder. In the drawings, the main scan direction is set as an x direction, the secondary scan direction is set as a y direction, and a thickness direction of the substrate 1 is set as a z direction. During printing, the printing medium C1 is transported along a direction pointed by the arrow in FIG. 2 in the secondary scan direction y. In the secondary scan direction y, a direction pointed by the arrow in the drawing is set as a downstream, and an opposite direction is set as an upstream. In the thickness direction z, a direction pointed by the arrow in the drawing is set as the top, and an opposite direction is set as the bottom.

[Substrate 1]

As shown in FIG. 1, the substrate 1 is a plate extending long in the main scan direction x. The substrate 1 is a support component that supports the protection layer 2, the electrode layer 3, the resistor layer 4 and the plurality of driver ICs 7. The substrate 1 has a base material 11 and a glaze layer 12.

The base material 11 is made of, for example, ceramics such as aluminum nitride (AlN), aluminum oxide ($Al_2O_3$) and zirconium oxide. The thickness of the base material 11 is, for example, 0.6 mm or more and 1.0 mm or less. As shown in FIG. 1, the base material 1 is a rectangle extending long in the main scan direction x in a top view. The base material 11 has a first main surface 11a and a first back surface 11b. The first main surface 11a is spaced apart from the first back surface 11b in the thickness direction z. The first main surface 11a is an upper surface of the base material 11, and faces the top of the thickness direction z. The first back surface 11b is a lower surface of the base material 11, and faces the bottom of the thickness direction z.

The glaze layer 12 is formed on the base material 11. The glaze layer 12 covers at least a part of the first main surface 11a. The glaze layer 12 is made of a glass material such amorphous glass. The glaze layer 12 includes a partial glaze 121 and a glass layer 122. However, the glaze layer 12 may exclude the glass layer 122 but consist of only the partial glaze 121, or may exclude the partial glaze 121 but consist of only the glass layer 122. Alternatively, substrate 1 may exclude the glass layer 12.

The partial layer 121 extends long in the main scan direction x. The partial glaze 121 bulges in the thickness direction z in a view of the main scan direction x. As shown in FIG. 4, the partial glaze 121 has a shape with a circular arc end edge in a cross section (y-z cross section) on a plane orthogonal to the main scan direction x. The partial glaze 121 is provided to enable a heating portion (the heat generating portions 41 below) in the resistor layer 4 to easily abut against the printing medium C1. Moreover, the partial glaze 121 is provided to serve as a heat accumulation layer for accumulating heat from the heat generating portions 41. The dimension of the partial glaze 121 in the thickness direction z (maximum dimension) is larger than that of the glass layer 122.

The glass layer 122 is formed adjacent to the partial glaze 121, and has an upper surface in a flat shape. The glass layer 122 overlaps a part of the partial glaze 121. The glass layer 122 has a thickness of, for example, approximately 2.0 µm. The glass layer 122 is for covering the first main surface 11a of the base material 11 that is relatively coarse, and is formed as a smooth surface suitable for forming the electrode layer 3.

In the glaze layer 12, the partial glaze 121 is made of glass material having a softening point of 800° C. or more and 850° C. or less, and the glass layer 122 is made of a glass material having a softening point of approximately 680° C. That is to say, the glass material forming the glass layer 122 has a lower softening point compared to the glass material forming the partial glaze 121. In addition, the material of the glass layer 122 is preferably a glass paste having a viscosity lower than the glass paste serving as the material of the partial glaze 121.

[Electrode Layer 3]

The electrode layer 3 forms a conduction path for electrically conducting the resistor layer 4. The electrode layer 3 is made of an electrically conductive material. The electrode layer 3 is made of a metal containing such as Au, Ag and Cu. The electrode layer 3 is formed on the glaze layer 12 of the substrate 1. The electrode layer 3 has a thickness of, for example, 1 µm or more and 7.5 µm or less (preferably approximately 5.0 µm). As shown in FIG. 3 and FIG. 4, the electrode layer 3 includes a common electrode 31 and a plurality of individual electrodes 34. Moreover, the shapes and configurations of the parts of the electrode layer 3 are not limited to the examples shown in FIG. 3 and FIG. 4, and may be implemented by various other configurations. In addition, the materials of the parts of the electrode layer 3 are likewise not limited.

As shown in FIG. 3 and FIG. 4, the common electrode 31 includes a plurality of second striped portions 32 and a connection portion 33. The connection portion 33 is arranged close to an end edge on the downstream side in the secondary scan direction y of the substrate 1, and is a stripe that extends in the main scan direction x. The plurality of second striped portions 32 extend from the connection portion 33 in the secondary scan direction y, and are arranged at equal intervals in the main scan direction x. An arrangement interval of the plurality of second striped portions 32 in the main scan direction x is, for example, 42.3 µm to 84.6 µm. A front end (an end on the upstream side in the secondary scan direction y) of the second striped portion 32 is located on the partial glaze 121.

In the example shown in FIG. 3, in order to reduce the resistance value of the connection portion 33, an Ag layer 331 is layered on the connection portion 33, but layering of the Ag layer 331 is optional. The Ag layer 331 is formed by printing and firing a paste containing, for example, an organic Ag compound, or a paste containing Ag particles, a glass material, Pd and resin.

The plurality of individual electrodes 34 are for partially electrically conducting the resistor layer 4. The polarity of the individual electrodes 34 is opposite to that of the common electrode 31. The individual electrodes 34 extend from the resistor layer 4 to the driver ICs 7. The plurality of individual electrodes 34 are arranged in the main scan direction x. Each of the individual electrodes 34 includes a first striped portion 35, a connection portion 36 and a bonding portion 37.

As shown in FIG. 3, the first striped portion 35 extends in the secondary scan direction y, and is a stripe in a view of the thickness direction z. Each of the first striped portions 35 is arranged at an interval from the second striped portion 32 adjacent to the common electrode 31 in the secondary scan direction y. In addition, the first striped portion 35 and the second strip portion 32 that are opposite in the secondary scan direction y have substantially the same position in the main scan direction x. An arrangement interval of the plurality of first striped portions 35 in the main scan direction x is, for example, 42.3 µm to 84.6 µm. A front end (an end on the downstream side in the secondary scan direction y) of the first striped portion 35 is located on the partial glaze 121.

The connection portion 36 is a part that extends from the first striped portion 35 to the upstream side in the secondary scan direction y. The connection portion 36 includes a parallel portion 361 and a sloped portion 362. The parallel portion 361 has one end connected to the bonding portion 37, and extends in the secondary scan direction y. The sloped portion 362 is sloped relative to the secondary scan direction y. The sloped portion 362 is sandwiched between the parallel portion 361 and the first striped portion 35 in the secondary scan direction y.

As shown in FIG. 3, the plurality of bonding portions 37 are formed on end portions on the upstream side of the individual electrodes 34 in the secondary scan direction y, and are connected to the parallel portions 361, respectively. The bonding portions 37 are bonded with the respective lead wires 61. Accordingly, the individual electrodes 34 are electrically connected to the driver ICs 7 through the lead wires 61.

In the example shown in the drawing, each of the bonding portions 37 includes a first bonding portion 37A and a second bonding portion 37B. The width of the parallel portion 361 sandwiched between adjacent two of the first bonding portions 37A (the length in the main scan direction x) is, for example 10 µm or less. In addition, the second bonding portion 37B is located on a side farther away from the resistor layer 4 than the first bonding portion 37A in the y direction. The second bonding portion 37B is connected to the parallel portion 361 sandwiched between adjacent two of the first bonding portions 37A. With the configuration above, mutual interference of the plurality of bonding portions 37 is prevented even if having a width that is greater than almost those of all parts of the connection portions 36.

[Resistor Layer 4]

The resistor layer 4 is made of a material having a resistivity greater than that of the material forming the electrode layer 3. The resistor layer 4 is made of, for example, ruthenium oxide. As shown in FIG. 3 and FIG. 4, the resistor layer 4 is formed on the partial glaze 121. The resistor layer 4 has a thickness of, for example, 3 µm or more and 6 µm or less. The material and thickness of the resistor layer 4 are not limited. The resistor layer 4 includes a plurality of heat generating portions 41.

The plurality of heat generating portions 41 are arranged at intervals in the main scan direction x. Each of the heat generating portions 41 overlaps the opposite first striped portion 35 and second striped portion 32 in the secondary scan direction y. That is to say, the dimension of the heat generating portion 41 in the secondary scan direction y is greater than a distance between the first striped portion 35 and the second striped portion 32 in the secondary scan direction y. In addition, in this embodiment, the dimensions of the plurality of heat generating portions 41 in the secondary scan direction y are substantially the same. The heat generating portion 41 is layered on an opposite side of the substrate 1 relative to first striped portion 35 and second striped portion 32 in the thickness direction z. In the example shown in the drawings, the heat generating portion 41 is a stripe that extends in the secondary scan direction y. Moreover, the shape of the heat generating portion 41 is not limited.

[Protection Layer 2]

The protection layer 2 is used for protecting the electrode layer 3 and the resistor layer 4. The protection layer 2 exposes regions of the plurality of individual electrodes 34 including the plurality of bonding portions 37. The protection layer 2 is made of a glass material such as amorphous glass. The protection layer 2 may also be formed by laminating a first layer made of amorphous glass and a second layer made of silicon aluminum oxynitride (SiAlON). SiAlON is a silicon nitride engineering ceramic formed by synthesizing aluminum oxide ($Al_2O_3$) and silicon dioxide ($SiO_2$) in silicon nitride ($Si_3N_4$). The second layer is formed by, for example, sputtering. The second layer may also be implemented by silicon carbide (SiC) in substitution for SiAlON.

[Connection Substrate 5]

As shown in FIG. 1 and FIG. 2, the connection substrate 5 is configured on the upstream side in the secondary scan direction y relative to the substrate 1. The connection substrate 5 is, for example, a printing substrate, and has a wiring pattern (not shown). A connector 59 below is mounted on the connection substrate 5. The shape of the connection substrate 5 is not specifically limited, and is a rectangle having the x direction as the length direction in this embodiment. The connection substrate 5 has a second main surface 5a and a second back surface 5b. The second main surface 5a is a surface facing the same side as the first main surface 11a of the base material 11, and the second back surface 5b is a surface facing the same side as the first back surface 11b of the base material 11.

The connector 59 is mounted on the connection substrate 5 in this embodiment. The connector 59 is for electrically connecting the thermal print head A1 to a control portion (not shown) of a thermal printer. The connector 59 is connected to the wiring pattern (not shown) of the connection substrate 5.

[Driver ICs 7]

The plurality of driver ICs 7 are mounted on the substrate 1, and are for respectively electrically conducting the plurality of heat generating portions 41. More specifically, the driver ICs 7 control whether to pass an electrical current to the heat generating portions 41 by connecting or disconnecting the individual electrodes 34 and the ground electrode (not shown). The driver ICs 7 may be mounted in a manner of crossing the substrate 1 and the connection substrate 5, or may be mounted on the connection substrate 5. The plurality of driver ICs 7 are connected to the plurality of individual electrodes 34 (the plurality of bonding portions 37) through the plurality lead wires 61. Energization control of the plurality of driver ICs 7 for the plurality of heat generating portions 41 is determined by an instruction signal inputted through the connection substrate 5 from outside the thermal print head A1. The plurality of driver ICs 7 are connected to the wiring pattern (not shown) of the connection substrate 5 through the plurality of lead wires 62. The plurality of driver ICs 7 are appropriately provided according to the number of the plurality of heat generating portions 41.

[Protective Resin 78]

The protective resin 78 covers the plurality of driver ICs 7, the plurality of lead wires 61 and the plurality of lead wires 62. The protective resin 78 is made of, for example, insulative resin, and is, for example, black. The protective resin 78 is formed in a manner of crossing the substrate 1 and the connection substrate 5 in this embodiment.

[Heat Dissipation Component 8]

As shown in FIG. 2, the heat dissipation component 8 supports the substrate 1 and the connection substrate 5. The heat dissipation component 8 is for dissipating a part of the heat generated by the plurality of heat generating portions 41 through the substrate 1 to outside. The heat dissipation component 8 is, for example, a block component made of a metal such as Al. As shown in FIG. 2, the heat dissipation component 8 has a support surface 81. The support surface 81 individually faces the upper side of the thickness direction z. The first back surface 11b of the base material 11 and the second back surface 5b of the connection substrate 5 are bonded on the support surface 81.

Next, details of an example of the manufacturing method for the thermal print head A1 are given with reference to FIG. 5 to FIG. 13 below.

FIG. 5 shows a flowchart of an example of the method for manufacturing the thermal print head A1. As shown in the drawing, the method for manufacturing the thermal print head A1 of this embodiment includes a substrate preparing step, an electrode layer forming step, a resistor layer forming step and a protection layer forming step.

[Substrate Preparing Step]

As shown in FIG. 6, the substrate 1 is prepared. In the step of preparing the substrate 1, the glaze layer 12 is formed on the base material 11. The base material 11 is made of ceramics, and the raw material of the ceramics is such as AlN, $Al_2O_3$ and zirconium oxide. The base material 11 has the first main surface 11a facing the top of the thickness direction z. The first main surface 11a has miniature bumps (first bumps) formed due to a green body of the base material 11 (ceramics), and is a coarse surface. Then, a thick film of a glass paste is printed on the first main surface 11a of the base material 11, and the glass paste is fired. At this point, the partial glaze 121 is first formed, and then the glass layer 122 is then formed. Accordingly, the glaze layer 12 is formed, and the substrate 1 shown in FIG. 6 is fully prepared at this point. In addition, the firing temperature (for example, 890° C.) for forming the partial glaze 121 is higher than the firing temperature (for example, 850° C.) for forming the glass layer 122.

[Electrode Layer Forming Step]

As shown in FIG. 5, the electrode layer forming step of this embodiment includes an electrically conductive paste coating process, an electrically conductive paste firing process and a conductive film patterning process.

(Electrically Conductive Paste Coating Process)

As shown in FIG. 7 and FIG. 8, an electrically conductive paste 30 is applied on the substrate 1 by, for example, thick-film printing. In this embodiment, the electrically conductive paste 30 is implemented by, for example, a resinate Au paste. The resinate Au paste contains Au as a metal component, and further contains additional elements such as rhodium, vanadium, bismuth and silicon. The metal component is not limited to being Au, and may also be Ag or Cu.

(Electrically Conductive Paste Firing Process)

Next, the electrically conductive paste 30 is fired to form a conductive film. The conductive film contains Au as a metal component, and forms a film covering a region coated by the electrically conductive paste 30, as shown in FIG. 7 and FIG. 8.

(Conductive Film Patterning Process)

Next, the conductive film is patterned. The patterning is, for example, patterning a photosensitive resist film, which is formed on the conductive film, by photolithography. Then, the resist film is used as a mask to etch the conductive film. Accordingly, the electrode layer 3 shown in FIG. 9 is obtained.

Moreover, different from that in this embodiment, a photosensitive paste may also be used as the electrically conductive paste 30. In this case, a photosensitive process such as photolithography may be performed on the electrically conductive paste 30 to further perform patterning.

Moreover, the Ag layer 331 may be formed by a method below: after patterning the electrically conductive paste, printing a thick film of an Ag-containing paste on the connection portion 33 of the common electrode 31, and then performing a firing process.

[Resistor Layer Forming Step]

As shown in FIG. 5, the resistor layer forming layer of this embodiment includes a resistor paste coating process, a resistor paste firing process, and a resistor film removal process.

(Resistor Paste Coating Process)

A resistor paste containing ruthenium oxide is applied on the substrate 1 by, for example, thick-film printing. At this point, the resistor paste is applied in a stripe that extends in the main scan direction x. In addition, the resistor paste is applied in a stripe that overlaps the plurality of first striped portions and the plurality of second striped portions. The dimension of the striped resistor paste in the secondary scan direction y is greater than a distance between the first striped portion 35 and the second striped portion 32 in the secondary scan direction y.

(Resistor Paste Firing Process)

Next, the resistor paste is fired. Accordingly, the resistor film 40 shown in FIG. 10 is obtained. The resistor film 40 is located on the partial glaze 121 of the glaze layer 12 of the substrate 1, and sequentially overlaps a part of the plurality of first striped portions 35 and the plurality of second striped portions 32.

(Resistor Paste Firing Process)

Then, as shown in FIG. 11 and FIG. 12, a part of the resistor film 40 is removed. In the removal process, a plurality of removal regions 49 are set in the resistor film 40, and these removal regions 49 are removed. The removal regions 49 include a first region 491, a second region 492 and a third region 493. The first region 491 is located between adjacent first striped portions 35 in the main scan direction x. The second region 492 is a region located between adjacent second striped portions 32 in the main scan direction x. The third region 493 is located between the first region 491 and the second region 492 in the secondary scan direction y. The removal region 49 is a striped portion or a linear portion extending in the secondary scan direction y, and traverses the resistor film 40 in the secondary scan direction y. In addition, setting of the removal region 49 is performed according to manufacturing conditions of implementing the removal process, and does not mean that visible symbols need to be marked, characteristic geometric shapes need to be formed or apparatuses need to be provided on the resistor film 40.

In this embodiment, the plurality of removal regions 49 are removed by a laser beam L. The type of the laser beam L is not limited, given that the removal regions 49 can be removed. In this embodiment, the laser beam L is implemented by a picosecond laser having a pulse width of approximately 1 picosecond to 25 picoseconds. Alternatively, a nanosecond laser may also be used. Moreover, the wavelength of the laser beam L is not limited, and for example, an infrared laser having an infrared wavelength is used.

In this embodiment, by facing the removal regions 49, the laser beam L is configured to scan along the secondary scan direction y. That is to say, in the example in FIG. 11, the laser beam L is configured to scan along the secondary scan direction y according to an order of the second region 492, the third region 493 and the first region 491. Accordingly, a slit extending in the secondary scan direction y is produced at the resistor film 40, and the heat generating portions 41 are sequentially formed. Then, all of the removal regions 49 are removed, and as shown in FIG. 13, the resistor layer 4 including the plurality of heat generating portions 41 is formed. In FIG. 13, an imaginary line is used to represent the part illuminated by the laser beam L. At this part, a color change takes place at marks occurring due to the irradiating laser beam L, and sometimes these marks remain as processing marks that divide the adjacent heat generating portions 41.

In addition, in the resistor film removal process of the disclosure, the process for removing the removal regions 49 is not limited to a configuration in which the resistor film 40 is clearly divided and in which the plurality of heat generating portions 41 are formed in completely different regions. For example, according to an output setting of the laser beam L or an ultimate result of the thickness of the resistor film 40, it is possible that a configuration in which adjacent heat generating portions 41 are connected by a small part of the resistor layer 4 is resulted. Even in the configuration above, given that the heat generating portions 41 substantially individually generate heat and are capable of forming a configuration of respective printing points, such configuration is included as a configuration formed by the resistor film removal process of the disclosure. The same applies to embodiments below.

Then, with the formation of the protection layer 2, the installation of the driver ICs 7 and the bonding of the lead wires 61, the thermal print head A1 shown in FIG. 1 to FIG. 4 is obtained.

Next, effects of the method for manufacturing the thermal print head A1 are given below.

According to the embodiment, as shown in FIG. 11, the resistor layer 4 including the plurality of heat generating portions 41 is obtained by removing the plurality of removal regions 49 set at the resistor film 40. The interval between the plurality of heat generating portions 41 can be made smaller than an interval that can be formed by, for example, printing or etching. These heat generating portions 41 are electrically conducted by the first striped portions 35 and the second striped portions 32 that are arranged opposite in the secondary scan direction y, and thus one heat generating portion 41 can form one printing point. Thus, high definition of the thermal print head A1 is achieved.

In the resistor film removal process shown in FIG. 11 and FIG. 12, the removal regions 49 can be more accurately removed by using the laser beam L. Moreover, various types of removal regions 49 can be removed by using the laser beam L. Accordingly, if the laser beam L is implemented by a picosecond laser having a pulse width of approximately 1 picosecond to 25 picoseconds, heat generating portions 41 that are sharper in shape may be formed.

Figure 14:
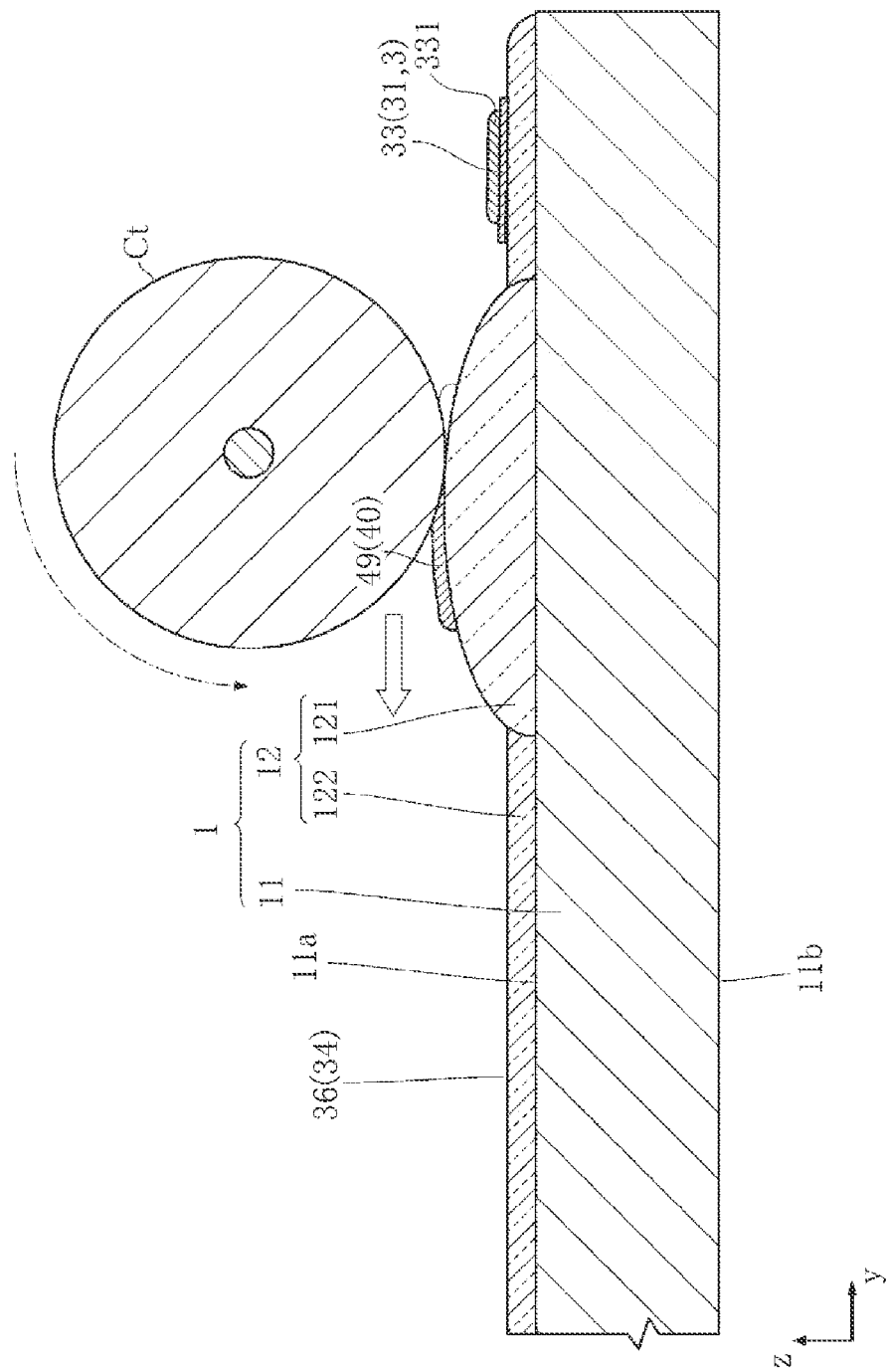
FIG. 14 is an enlarged section diagram of the main part in a method for manufacturing a thermal print head according to a second embodiment of the disclosure.

FIG. 14 to FIG. 12 show other embodiments of the disclosure. In these drawings, elements that are the same or similar to those of the embodiment above are assigned with the same denotations or numerals.

Second Embodiment

FIG. 14 shows a resistor film removal process in a method for manufacturing a thermal print head according to a second embodiment of the disclosure. The manufacturing method of this embodiment is in a configuration shown by the flowchart in FIG. 5, and differs by the resistor film removal process compared to the embodiment above.

A rotary blade Ct is used in the resistor film removal process of this embodiment. The rotary blade Ct is a cutting blade that rotates around a rotation axis extending in the main scan direction x. The rotary blade Ct is configured to cut the resistor film 40 while moving in the secondary scan direction y along the plurality of removal regions 49 shown in FIG. 11. By sequentially repeating the cutting process, the resistor layer 4 including the plurality of heat generating portions 41 shown in FIG. 13 is obtained. At a cut part of the resistor film 40 in the substrate 1, trenched marks occurring due to cutting by abrasive grains serve as processing marks dividing adjacent heat generating portions 41 and remain.

High-definition printing of a thermal print head is also achieved by this embodiment. Moreover, it is understood from the embodiment that, the removal method used in the resistor film removal process of the disclosure is not limited.

Third Embodiment

Figure 15:
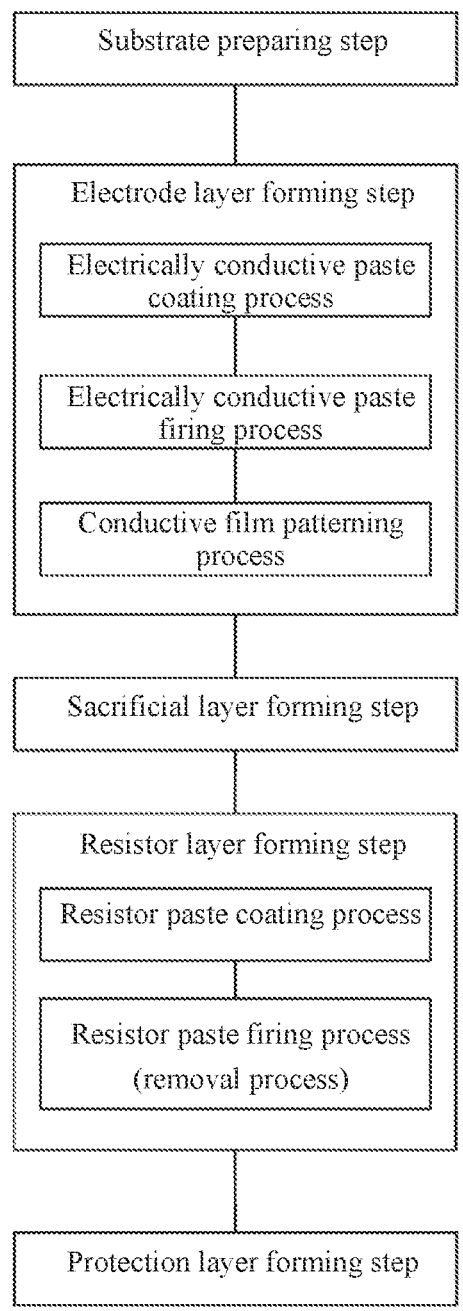
FIG. 15 is a flowchart of a method for manufacturing a thermal print head according to a third embodiment of the disclosure.

FIG. 15 to FIG. 21 show a method for manufacturing the thermal print head according to a third embodiment of the disclosure. As shown in FIG. 15, the manufacturing method of this embodiment includes a sacrificial layer forming step, and a removal process is performed collectively with a resistor paste firing process, and these are different from the embodiments above.

[Sacrificial Layer Forming Step]

Figure 16:
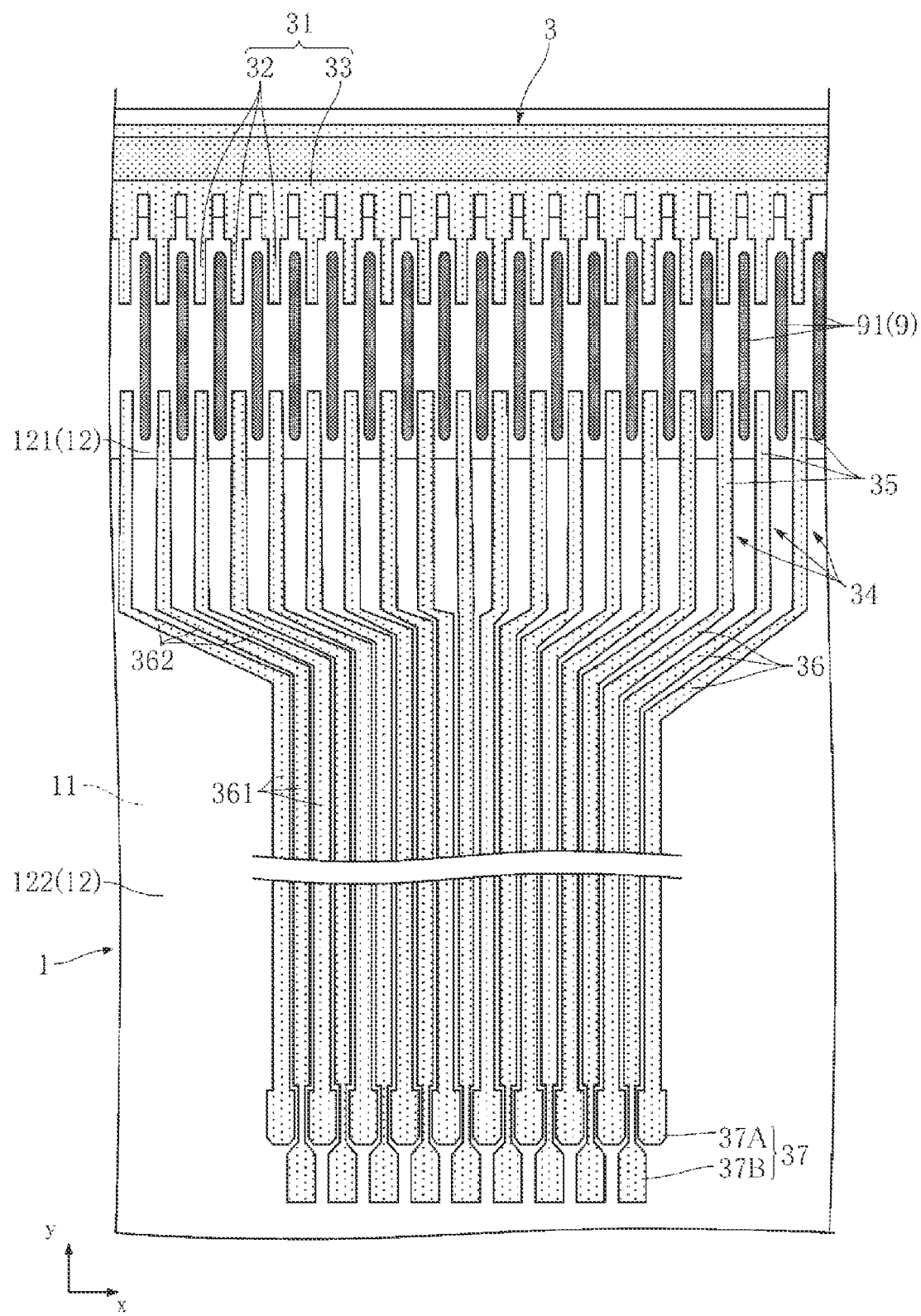
FIG. 16 is an enlarged top view of the main part in a method for manufacturing a thermal print head according to the third embodiment of the disclosure.

With reference to FIG. 7 to FIG. 9, after the electrode layer forming step and before the resistor layer forming step, a sacrificial layer forming step is performed. In the sacrificial layer forming step, as shown in FIG. 16, a plurality of linear portions 91 are formed in a region (first region) between adjacent first striped portions 35 in the main scan direction x, a region (second region) between adjacent second striped portions 32 in the main scan direction x, and a region (third region) between the regions (first and second regions) in the secondary scan direction y. These regions are equivalent to the removal regions 49.

The sacrificial layer 9 (the plurality of linear portions 91) are made of a resin, or a resin (for example, a photosensitive phenolic resin) forming a common resistant layer may be used. As shown in the drawings, for example, a photosensitive resin material is applied in an even thickness (for example, 3 μm to 10 μm) and dried to form a resistant layer. The sacrificial layer 9 consisting of the plurality of linear portions 91 is obtained by applying photolithography on the resistant layer. The linear portion 91 is a stripe that extends in the secondary scan direction y. The dimension of the linear portion 91 in the secondary scan direction y is greater than a distance between the first striped portion 35 and the second striped portion 32 arranged in opposite in the secondary scan direction y. The width of the linear portions 91 in the main scan direction x is, for example, approximately 10 μm to 40 μm.

[Resistor Layer Forming Step]

(Resistor Paste Coating Process)

Figure 17:
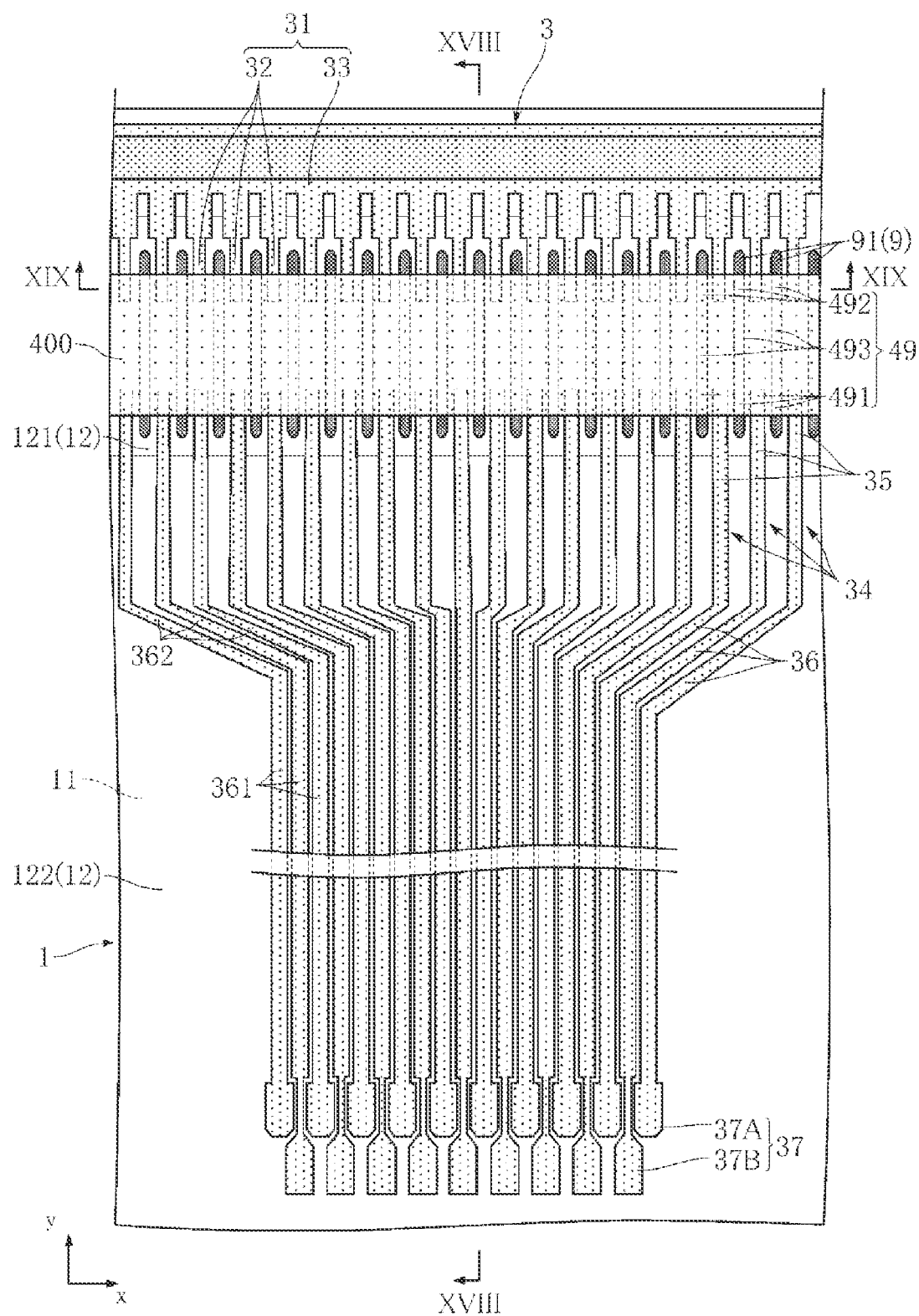
FIG. 17 is an enlarged top view of the main part in a method for manufacturing a thermal print head according to the third embodiment of the disclosure.
Figure 18:
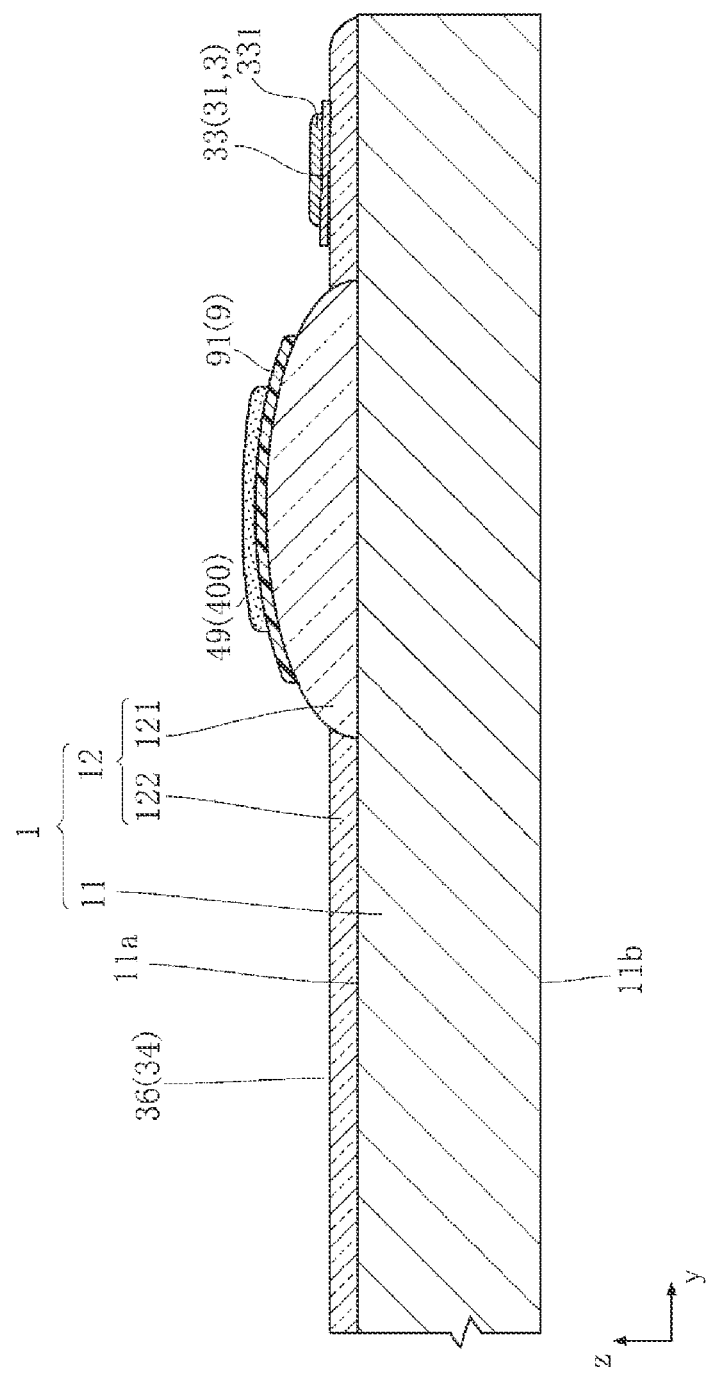
FIG. 18 is an enlarged section diagram of the main part along the line XVIII-XVIII in FIG. 17.
Figure 19:
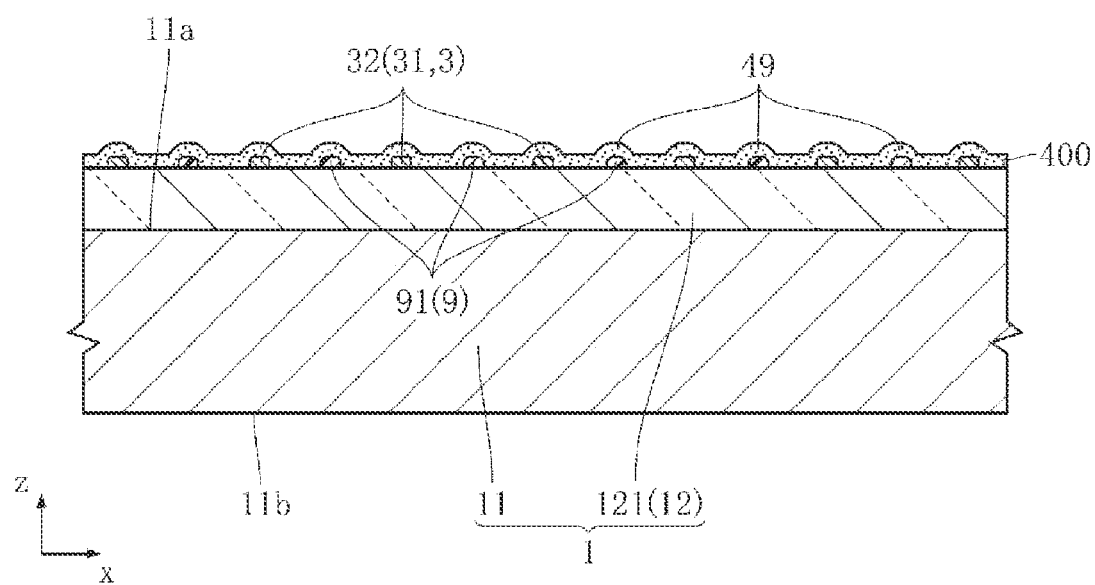
FIG. 19 is an enlarged section diagram of the main part along the line XIX-XIX in FIG. 17.

Then, as shown in FIG. 17 and FIG. 19, a resistor paste 400 is applied. In a coating process of applying the resistor paste 400, the resistor paste 400 is applied in a stripe that extends in the main scan direction x. The resistor paste 400 are positioned and sized to overlap the plurality of first striped portions 35, the plurality of second striped portions 32 and the plurality of linear portions 91. That is to say, the dimension of the resistor paste 400 in the secondary scan direction y is less than the dimension of the linear portion 91 in the secondary scan direction y, and is greater than the distance between the first striped portion 35 and the second striped portion 32 in the secondary scan direction y.

(Resistor Paste Firing Process)

Figure 20:
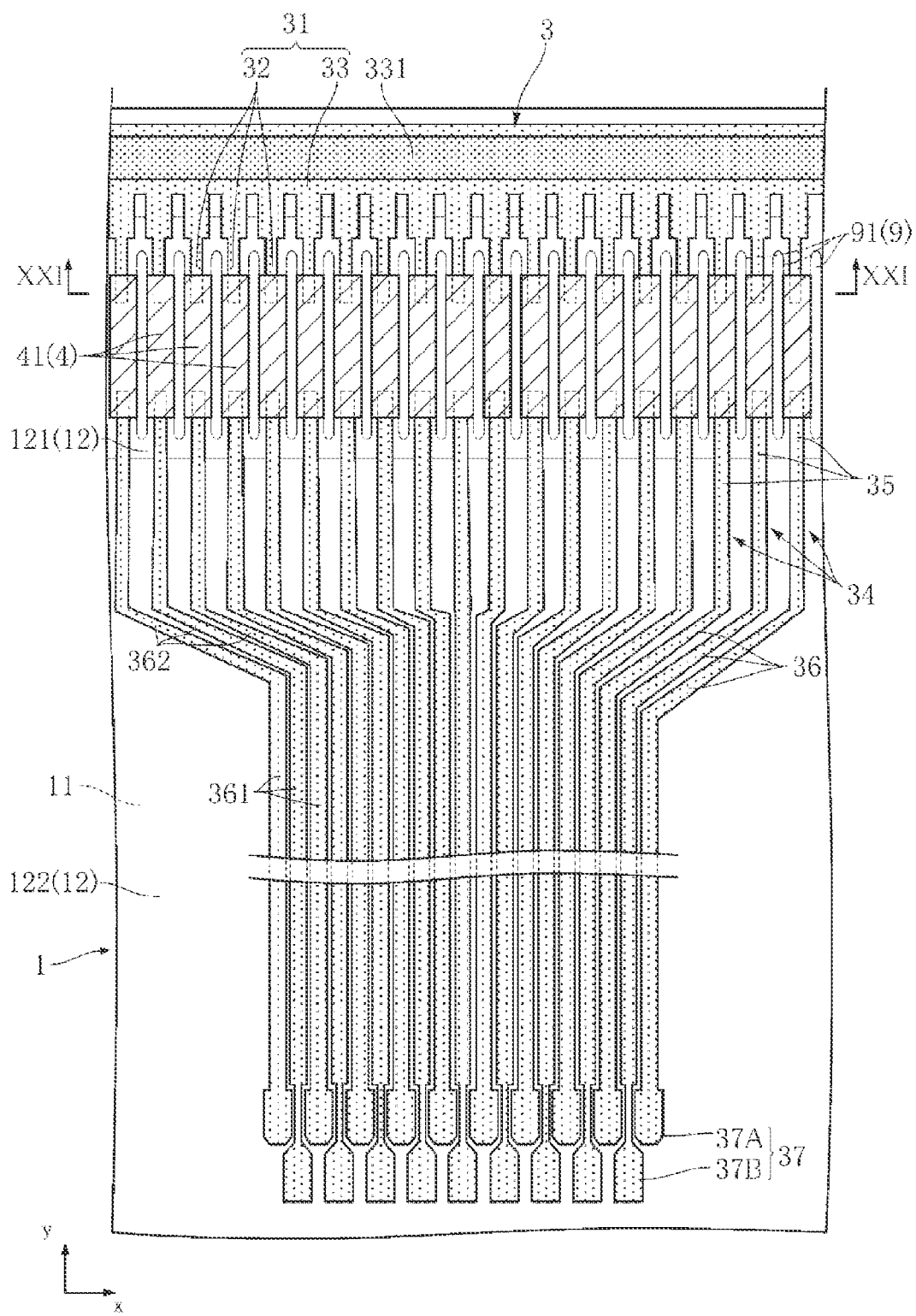
FIG. 20 is an enlarged top view of the main part in a method for manufacturing a thermal print head according to the third embodiment of the disclosure.
Figure 21:
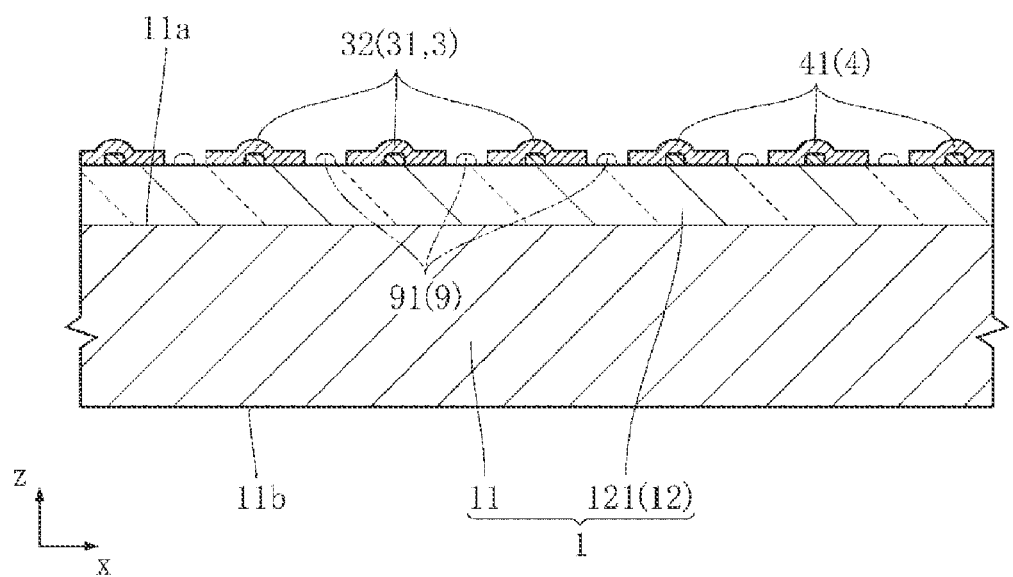
FIG. 21 is an enlarged section diagram of the main part along the line XXI-XXI in FIG. 20.

Next, the resistor paste 400 is fired. At this point, the firing temperature is approximately 750° C. to 850° C. For example, when or before the temperature in the furnace for firing reaches the firing temperature, the resin forming the linear portion 91 is volatized or burned. Accordingly, the plurality of linear portions 91 (sacrificial layer 9) are removed from the substrate 1. At this point, the regions in the resistor paste 400 that overlap the plurality of linear portions 91 in the non-fired state, that is, the removal regions 49, are together removed with the plurality of linear portions 91. Then, parts of the resistor paste 400 remaining on the substrate 1 are fired, and as shown in FIG. 20 and FIG. 21, the resistor layer 4 having the plurality of heat generating portions 41 is formed. At parts at the plurality of linear portions 91 (sacrificial layer 9) already removed from the substrate 1, a color change takes place at marks occurring due to the volatized or burned resin forming the linear portions 91, and sometimes these marks remain as processing marks that divide the adjacent heat generating portions 41.

High-definition printing of a thermal print head is also achieved by this embodiment. Moreover, in the method for forming the plurality of linear portions 91, the substrate 1 is less likely to be exposed to an excessively high temperature, or an external force of a magnitude acting on the substrate 1 is less likely generated during the process of normal use.

In this embodiment, the resistor paste 400 before firing and the plurality of linear portions 91 (sacrificial layer 9) are together removed, and then firing is completed. Thus, the remaining resistor paste 400 for forming the plurality of heat generating portions 41 in overall more reliably achieves the firing temperature. Moreover, manufacturing efficiency is promoted by applying a resin material using such as thick-film printing.

The method for manufacturing a thermal print head of the disclosure is not limited to the embodiments described above. Various design modifications may be made as desired to the specific configurations in the method for manufacturing the thermal print head of the disclosure.

[Note 1]

A method for manufacturing a thermal print head, comprising:
 forming an electrode layer on a substrate; and
 forming a resistor layer including a plurality of heat generating portions connected to the electrode layer;
 wherein the electrode layer includes a plurality of individual electrodes including a plurality of first striped portions extending in a secondary scan direction and spaced apart in a main scan direction, and a common electrode including a plurality of second striped portions extending in the secondary scan direction and arranged opposite to the plurality of first striped portions in the secondary scan direction; and wherein the forming of the resistor layer includes:

a coating process of applying a resistor paste in a stripe that overlaps the plurality of first striped portions and the plurality of second striped portions and extends in the main scan direction;

a firing process of firing the resistor paste to form a resistor film; and a removal process of removing a removal region in the resistor paste or the resistor film, the removal region including: a first region located between adjacent two of the plurality of first striped portions in the main scan direction, a second region located between adjacent two of the plurality of second striped portions in the main scan direction, and a third region located between the first region and the second region in the secondary scan direction.

[Note 2]
The method for manufacturing a thermal print head of note 1, wherein the removal process removes the removal region of the resistor film after the firing process.

[Note 3]
The method for manufacturing a thermal print head of note 2, wherein a laser beam is used in the removal process.

[Note 4]
The method for manufacturing a thermal print head of note 3, wherein in the removal process, the laser beam is scanned to traverse the resistor film along the secondary scan direction.

[Note 5]
The method for manufacturing a thermal print head of note 4, wherein the laser beam is an infrared laser.

[Note 6]
The method for manufacturing a thermal print head of note 5, wherein the laser beam is a pulse laser having a pulse width of 1 picosecond to 25 picoseconds

[Note 7]
The method for manufacturing a thermal print head of note 2, wherein in the removal process, the removal region is removed using a rotary blade that rotates around a rotation axis extending in the main scan direction.

[Note 8]
The method for manufacturing a thermal print head of note 7, wherein in the removal process, the rotary blade is moved in the secondary scan direction.

[Note 9]
The method for manufacturing a thermal print head of note 1, further comprising a sacrificial layer forming step of forming a sacrificial layer in the first region, the second region and the third region before a step of forming the resistor layer;

wherein the first region is located between adjacent two of the plurality of first striped portions in the main scan direction, the second region is located between adjacent two of the plurality of second striped portions in the main scan direction, and the third region located between the first region and the second region in the secondary scan direction;

wherein in the coating process, the resistor paste is applied to cover the sacrificial layer;

wherein the removal process is performed by collectively removing the sacrificial layer and the resistor paste covering the sacrificial layer in the firing process.

[Note 10]
The method for manufacturing a thermal print head of note 9, wherein the sacrificial layer includes a plurality of linear portions extending along the secondary scan direction.

[Note 11]
The method for manufacturing a thermal print head of note 10, wherein a dimension of the linear portion in the secondary scan direction is greater than a distance between the first striped portion and the second striped portion in the secondary scan direction.

[Note 12]
The method for manufacturing a thermal print head of note 11, wherein in the coating process, a dimension of the resistor paste after being coated in the secondary scan direction is less than the dimension of the linear portion in the secondary scan direction.

[Note 13]
The method for manufacturing a thermal print head of any one of note 9 to 12, wherein the sacrificial layer is made of a resin.

[Note 14]
The method for manufacturing a thermal print head of any one of note 1 to 13, wherein the substrate includes a base material and a glaze layer formed on the base material.

[Note 15]
The method for manufacturing a thermal print head of any one of note 1 to 14, wherein the electrode layer includes gold (Au), silver (Ag) or copper (Cu).

[Note 16]
The method for manufacturing a thermal print head of any one of note 1 to 15, wherein the resistor layer includes ruthenium oxide.

[Note 17]
The method for manufacturing a thermal print head of any one of note 1 to 16, wherein the forming of the electrode layer includes;

coating a conductive paste on the substrate;
firing the conductive paste to form a conductive film; and
patterning the conductive film.

[Note 18]
A thermal print head, comprising:
a substrate:
a resistor layer, supporting the substrate, including a plurality of heat generating portions arranged in a main scan direction; and
an electrode layer, including a plurality of individual electrodes respectively connected to the plurality of heat generating portions and a common electrode connected to the plurality of heat generating portions;
wherein each of the plurality of individual electrodes includes a first striped portion extending in the secondary scan direction and connected to the heat generating portion, the common electrode includes a plurality of second striped portions extending in the secondary scan direction, arranged opposite to the plurality of first striped portions in the secondary scan direction and connected to the heat generating portion, and the substrate has process marks that divide the adjacent heat generating portions from each other in the main scan direction.

What is claimed is:
1. A method for manufacturing a thermal print head, comprising:
    forming an electrode layer on a substrate; and
    forming a resistor layer including a plurality of heat generating portions connected to the electrode layer,
        wherein the electrode layer comprises:

a plurality of individual electrodes including a plurality of first striped portions extending in a secondary scan direction and spaced apart in a main scan direction; and a common electrode including a plurality of second striped portions extending in the secondary scan direction and arranged opposite to the plurality of first striped portions in the secondary scan direction, and wherein the forming of the resistor layer includes:

a coating process in which a resistor paste is applied in a stripe that overlaps the plurality of first striped portions and the plurality of second striped portions and extends in the main scan direction;

a firing process for firing the resistor paste to form a resistor film; and a removal process for removing a removal region in the resistor paste or the resistor film, the removal region comprising:

a first region located between adjacent two of the plurality of first striped portions in the main scan direction;

a second region located between adjacent two of the plurality of second striped portions in the main scan direction; and a third region located between the first region and the second region in the secondary scan direction.

2. The method of claim 1, wherein the removal process removes the removal region of the resistor film after the firing process.

3. The method of claim 2, wherein a laser beam is used in the removal process.

4. The method of claim 3, wherein in the removal process, the laser beam is scanned to traverse the resistor film along the secondary scan direction.

5. The method of claim 4, wherein the laser beam is an infrared laser.

6. The method of claim 5, wherein the laser beam is a pulse laser having a pulse width of 1 picosecond to 25 picoseconds.

7. The method of claim 2, wherein in the removal process, the removal region is removed using a rotary blade that rotates around a rotation axis extending in the main scan direction.

8. The method of claim 7, wherein in the removal process, the rotary blade is moved in the secondary scan direction.

9. The method of claim 1, further comprising a sacrificial layer forming step forming a sacrificial layer in the first region, the second region and the third region before the step of forming the resistor layer, wherein the first region is located between adjacent two of the plurality of first striped portions in the main scan direction, the second region is located between adjacent two of the plurality of second striped portions in the main scan direction, and the third region located between the first region and the second region in the secondary scan direction, and wherein in the coating process, the resistor paste is applied to cover the sacrificial layer, and wherein the removal process is performed by collectively removing the sacrificial layer and the resistor paste covering the sacrificial layer in the firing process.

10. The method of claim 9, wherein the sacrificial layer comprises a plurality of linear portions extending along the secondary scan direction.

11. The method of claim 10, wherein a dimension of the linear portion in the secondary scan direction is greater than a distance between the first striped portion and the second striped portion in the secondary scan direction.

12. The method of claim 11, wherein in the coating process, a dimension of the resistor paste after being coated in the secondary scan direction is less than the dimension of the linear portion in the secondary scan direction.

13. The method of claim 9, wherein the sacrificial layer is made of a resin.

14. The method of claim 1, wherein the substrate comprises a base material and a glaze layer formed on the base material.

15. The method of claim 1, wherein the electrode layer comprises gold (Au), silver (Ag) or copper (Cu).

16. The method of claim 1, wherein the resistor layer comprises ruthenium oxide.

17. The method of claim 1, wherein the step of forming the electrode layer comprises:

coating a conductive paste on the substrate;

firing the conductive paste to form a conductive film; and patterning the conductive film.

* * * * *